July 19, 1960   K. A. OPLINGER ET AL   2,945,648
CONTROL ARRANGEMENTS FOR CRAFT OPERABLE IN SPACE
Filed Dec. 16, 1953   6 Sheets-Sheet 3

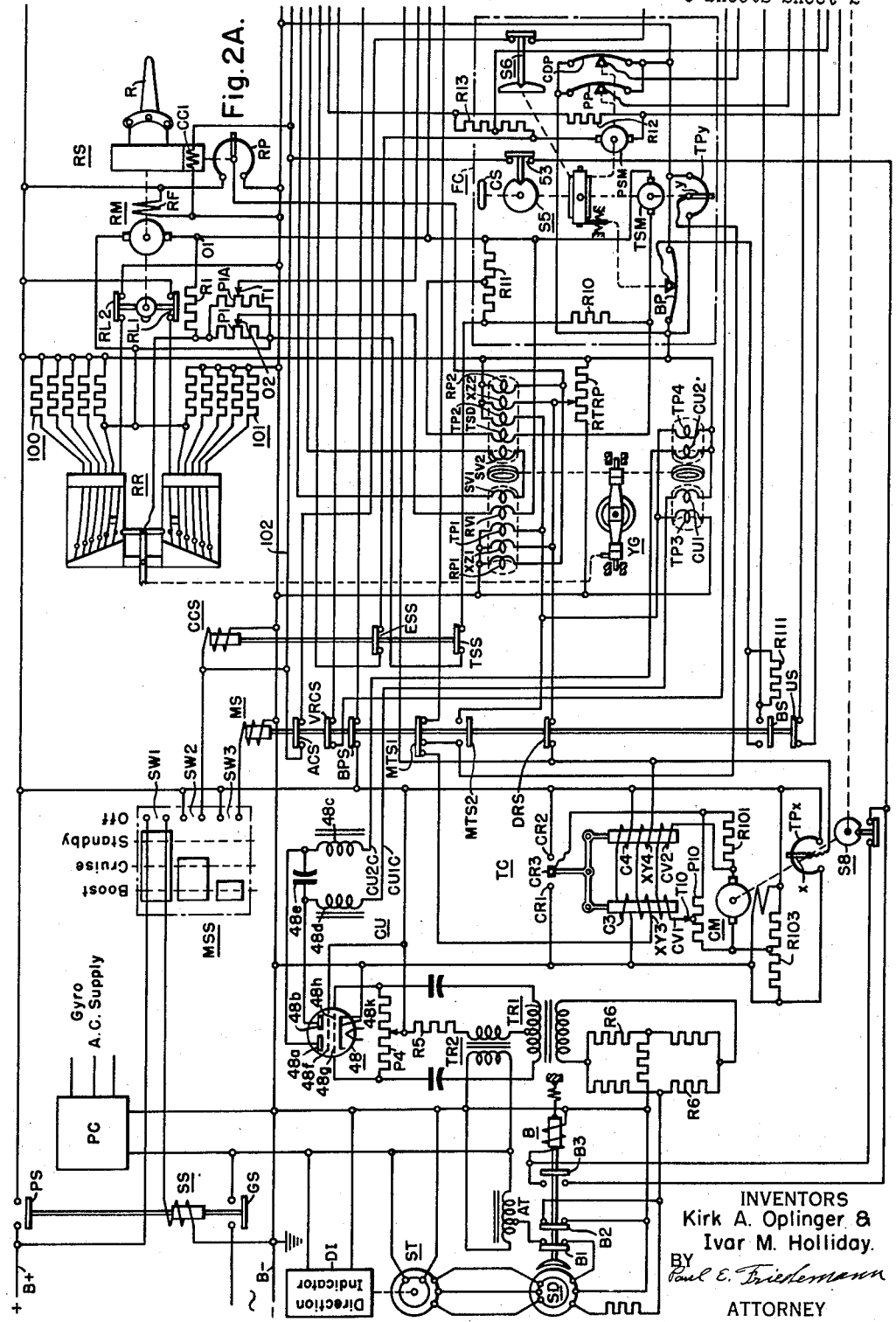

WITNESSES:
Robert C. Baird
E. F. Oberhein

INVENTORS
Kirk A. Oplinger &
Ivar M. Holliday.
BY Paul E. Friedemann
ATTORNEY

INVENTORS
Kirk A. Oplinger &
Ivar M. Holliday.
ATTORNEY

July 19, 1960 K. A. OPLINGER ET AL 2,945,648
CONTROL ARRANGEMENTS FOR CRAFT OPERABLE IN SPACE
Filed Dec. 16, 1953 6 Sheets-Sheet 5
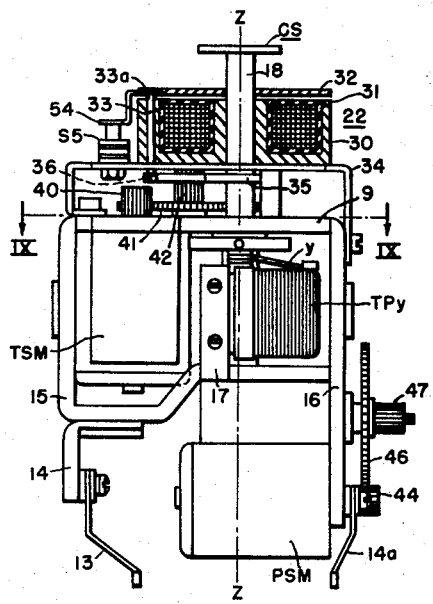
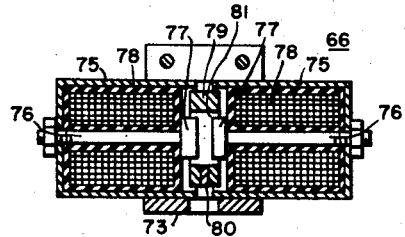
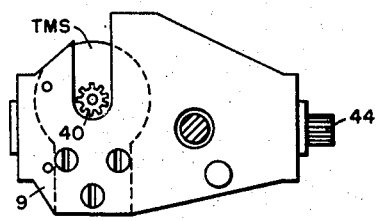
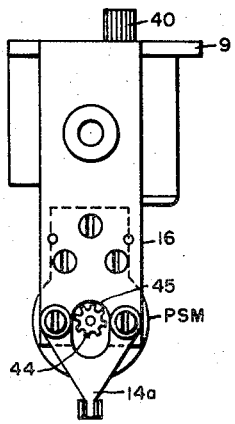
WITNESSES:
Robert C Baird
E. F. Oberheim
INVENTORS
Kirk A. Oplinger &
Ivar M. Holliday.
BY
Paul E. Friedemann
ATTORNEY

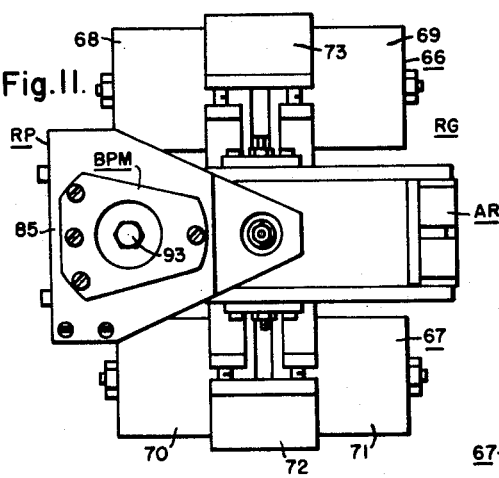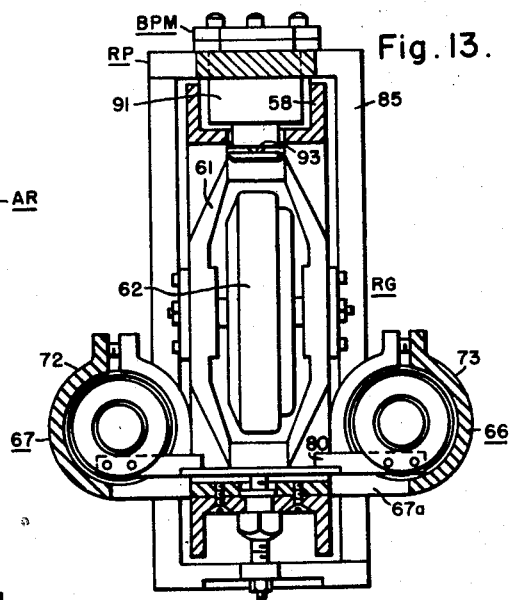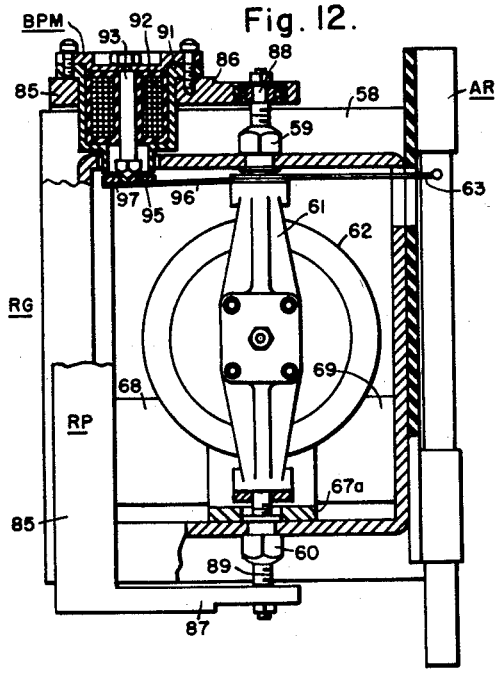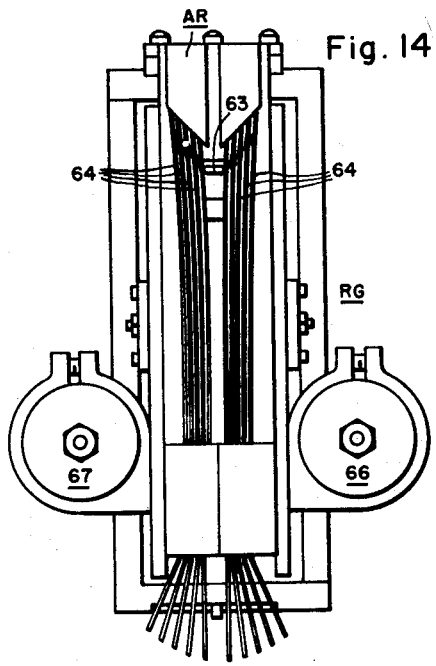

United States Patent Office 2,945,648
Patented July 19, 1960

2,945,648

CONTROL ARRANGEMENTS FOR CRAFT OPERABLE IN SPACE

Kirk A. Oplinger, Verona, Pa., and Ivar M. Holliday, Venice, Calif., assignors to Westinghouse Electric Corporation, East Pittsburgh, Pa., a corporation of Pennsylvania Filed Dec. 16, 1953, Ser. No. 398,565

23 Claims. (Cl. 244—77)

This invention relates generally to systems of control for craft operable in space.

The invention is herein illustrated and described as applied in the control of a conventional aircraft utilizing rudders, elevators and ailerons, respectively, for controlling the craft directionally, longitudinally, and laterally. However, it will be appreciated that the invention may be applied to other types of craft utilizing means other than the control surfaces mentioned for effecting maneuverability.

In order that the present invention may be fully appreciated, it is essential that the fundamental principles of flight control of fixed wing aircraft be understood.

The control of an aircraft may be resolved about three substantially mutually perpendicular axes, one is a vertical axis termed the turn or yaw axis, about which the turning or yawing movement of the craft takes place, such movement being effected by the application of left or right rudder for a turn to the left or to the right. A second axis disposed longitudinally of the craft and perpendicular to the mentioned vertical axis is termed the roll axis about which the aircraft rotates. Angular movement of the aircraft about the roll axis is controlled by the ailerons which are simultaneously operated in opposite directions, that is, one moves up as the other moves down to produce cumulative torques about the roll axis. The third axis passes laterally of the aircraft perpendicular to the aforenamed axis at the point of intersection thereof and is termed the pitch axis of the craft. Control of the craft about the pitch axis for climb, a dive or for level flight is afforded by the elevators which tilt the craft about the pitch axis to change the angle of attack of the wing and as a consequence the direction of flight of the craft in a vertical plane.

In still air, when the aircraft is oriented so that its roll and pitch axes are horizontal, it will tend to follow a course which is a projection of the roll axis or longitudinal axis but whenever the craft is rotated about one or more of the three control axes either by the application of one or more of its control surfaces or by air disturbances, the flight path as a rule changes.

It is important to note, and this is particularly true of the ailerons, that the position of the control surfaces does not determine the position of the aircraft about any of the control axes but rather determines the velocity of rotational movement of the craft about the corresponding axis. Thus in some instances in maneuvering the craft, it is necessary to perform double operations in the application of the control surfaces. In a simple turn, for instance, first the application of the control surfaces is made in a direction to cause the craft to assume the desired attitude in flight after which the ailerons are usually returned to a neutral or streamlined position and the rudder and elevators streamlined to a lesser extent. A return to level flight may then be effected by a reverse movement of the ailerons and movement of the rudder and elevators to their neutral positions.

Ordinarily, to properly execute a turn in an aircraft, it is essential that movement of the control surfaces be coordinated. Too much rudder will cause the craft to skid outwardly in a turn. Too much aileron will cause side slipping while insufficient application or over-application of the elevators during a turn will tend to cause, respectively, diving, and to a lesser degree, climbing.

In addition to the above-described proportioning of control surface movement which must be effected for coordination in a turn, there is also the consideration of suitable time delays, dependent upon aerodynamic coupling in the application or removal of rudder and elevators in the execution of simple turns. The ability of an aircraft to be turned by simple application of the rudder alone depends in some measure upon its aerodynamics. An inherently stable craft, upon the application of rudder and the skidding movement which follows, will tend to accumulate the bank angle necessary for equilibrium in the turn indicated by the setting of the rudder. However, in any case, a coordinated turn may not be executed satisfactorily in the absence of a bank angle.

Thus for a coordinated turn, it will be appreciated that the application of the rudder should be proportional to the angle of bank for a particular air speed and should be applied no more rapidly than, or should substantially follow, the angle of bank as the bank angle for the desired turn is accumulated. Suitable coordination of movement of the ailerons and rudder in certain types of craft therefore requires an application of the ailerons to produce a velocity of rolling movement about the roll axis to the desired angle of bank and the application of the rudder to produce the necessary turn velocities indicated by the instantaneous angles of bank or, stated otherwise, provides for an application of the rudder such that at a given air speed the turn velocity indicated by the position of the rudder corresponds to that for the instant angle of bank.

The considerations involved in the control of the elevators are analogous to those for the control of the rudder. Premature application of the elevators when entering a turn will cause the aircraft to climb while premature removal thereof while coming out of a turn will cause the aircraft to dive. The application of up-elevator for a turn in either direction compensates the loss in projected wing area for a given angle of bank by increasing the angle of attack of the wing to increase the lift and additionally introduces the needed pitch rate component of turn rate which increases with bank angle. Thus the angle of bank also indicates the pitch velocity of the aircraft in a turn and coordination of control at a given air speed requires that up-elevator be applied and removed as the angle of bank is increased or decreased.

The time delay in acquiring a given bank angle depends upon the characteristics of the particular aircraft. In general, the larger the aircraft the longer will be the time delay. Additionally at a given air speed, this delay will vary depending upon the degree of application of the ailerons which determines the roll velocity.

For fixed course control, an important function of an aircraft flight control system for automatic pilot is to fly the aircraft straight and level at a given altitude. To this end, the control must be quick to sense minor departures from fixed reference positions and/or to sense velocities about any of the three principal control axes to maintain a predetermined mode of operation.

Control systems intended to accomplish this end usually include gyroscopes to detect errors in flight from the predetermined flight pattern. Such gyroscopes in the past have been of the position type, that is, gyroscopes disposed on the aircraft to detect changes in flight attitude and produce signals which, when applied to suitable servo systems operating the control surfaces, restore the craft to the desired flight attitude. Two types of position gyroscopes are usually employed in such controls. One is a directional gyroscope which is oriented in the aircraft in such a way as to detect changes in the direction of flight of the aircraft. The second one is usually referred to as a vertical reference gyroscope which is disposed to detect or measure angular position deviations of the aircraft from the horizontal about the roll and pitch axes. Gyroscopes of the position type, however, by reason of their mounting have only a limited degree of angular freedom about a given reference position and hence limit the maneuverability of the craft when the control is in operation. If the maneuverability limit about a given axis is exceeded, the gimbal mounting of the gyroscope forces the gyro rotor assembly around in rotation with the aircraft about the given axis and the precessional response of the gyroscope results in "tumbling" rendering the automatic pilot useless.

To obviate such a limitation of control and obtain unlimited maneuverability and at the same time to provide a control system which detects velocity errors about the control axis rather than position errors, to achieve a faster and more sensitive control, this invention employs gyroscopes of the rate type for detecting angular velocities about each of the three principal control axes and for producing electrical quantities indicative of such velocities for controlling the corresponding servo system and, hence, controlling the aircraft about the corresponding axis. In this fundamental aspect, this invention is related to a U.S. Letters Patent of Clinton R. Hanna, No. 2,638,288, issued May 12, 1953, and entitled, "Control System for Craft Operable in Space," and assigned to the assignee of this invention.

This invention provides certain improvements in the fundamental control of the above-identified invention of Clinton R. Hanna, whereby, according to one of its aspects, the system may be controlled by a flight controller having three degrees of angular freedom, corresponding to the principal control axes of the aircraft, to achieve unlimited maneuverability of the aircraft.

Rate gyroscopes are ideal for an application of this type and to this end the gyroscopes, which are three in number, one for each principal axis of control, are restrained in their precessional response to input torques due to velocities about the corresponding control axis of the craft. Thus these gyroscopes which have a restrained single degree of freedom of output movement are unable to tumble from operating position regardless of the manner in which the craft is controlled. The minute precessional movements of each of the gyroscopes result in precessional torques or displacements which by suitable electrical pickoff devices are converted to electrical signals which control the servo mechanisms for the respective control surfaces.

In practicing this invention several modes of system operation are provided including, a "Standby" mode, a "Cruise" mode and a "Boost" mode. In an aircraft flown by conventional controls, for instance, control stick and rudder pedals, a separate flight controller having three degrees of angular freedom may be utilized to control the autopilot or the servo system of the craft.

A selector switch is provided which is operable from an "Off" position through successive positions which successively select the operating modes identified above. In operation the selector switch is moved from "Off" position to "Standby" position. This establishes the basic energization circuits for the automatic pilot and servos, providing a time interval for "warm up" in which the gyroscope rotors are brought up to operating speed and other units such as generators are started. The duration of this interval, of course, depends upon the longest warmup period required by a system component and the selector switch may be mechanically or electrically interlocked so that positive timing out of this interval is always provided. Additionally, circuits are established between the flight controller and the respective servo or control surfaces for controlling small motors used to drive the flight controller. This is a sort of followup mode of motor control which synchronizes the flight controller and, hence, the autopilot, by moving the flight controller to a position corresponding to its command position for achieving that control surface deflection.

Once the warmup interval is ended the system may be switched to the Cruise mode or through the Cruise mode to the Boost mode.

In the Cruise mode the autopilot yaw channel is slaved to the compass of the aircraft which superimposes yaw directivity on the yaw-rate sense, the pitch channel is slaved to an altitude-rate control which adds a vertical position sense to the pitch rate sense, and, the roll channel is slaved to a pendulous device, that is, a bank or roll pendulum, responsive to lateral acceleration and roll angle which adds the apparent vertical sense to the roll-rate sense in the roll channel.

The function of the system in the Cruise mode of operation is that of maintaining the craft in essentially straight and level flight along a fixed course determined by the human pilot by his setting of the compass, the angular rate sensing components of the system providing rate stabilization through anticipation and damping in each of the three degrees of angular freedom of the aircraft. Additionally the pendulous device and the altitude-rate control provide controls which respectively minimize lateral and vertical excursions.

While in the Cruise mode the human pilot may override the autopilot to change the flight attitude in any one or all of the three degrees of motion by suitable actuation of the flight controller. For example, to make a coordinated turn the human pilot need only rotate the flight controller stick about the proper one of its three axes of freedom. In one application this may be the vertical axis or yaw axis of the stick. In yet another application this may be the longitudinal or roll axis of the stick. The angular position of the flight controller, due to the rate sense of the autopilot then commands a given turn rate which is established and coordinated by the autopilot. Angular displacement of the flight controller for a coordinated turn removes the compass slaving and establishes connections to automatically reset the compass system as the course changes so that upon return of the flight controller to neutral the new heading or course is maintained.

The human pilot may also change altitude while in the Cruise mode whether following a compass course or executing a coordinated turn by rotation of the flight controller about another axis, for instance, by moving the flight controller fore or aft about an athwartship axis. Such flight controller displacement removes the altitude slaving in the pitch channel. The angular position of the flight controller now commands an angular pitch rate due to the angular rate sensing components to initiate a change in pitch altitude for a climb or a dive and the rate-of-change of altitude, for the flight controller position, is established by the altitude-rate control.

In the Boost mode of operation provision is made for removing compass, pendulum and altitude slaving in yaw, roll and pitch respectively. Additionally, if desired or needed, the altitude rate sense may be removed leaving the angular rate sense in each of the three control channels. In this mode, flight coordination is accomplished by the human pilot in much the same manner as with the conventional controls, excepting that the operation is essentially effortless requiring only a few ounces of force on the piloting element or stick of the flight controller. In this mode the instant position of the flight controller commands angular rates about the respective control axes, as in the Cruise mode, through the power amplification of the servo system.

One object of this invention is to provide a control for a craft operable in space which is simple in principle, involves a minimum number of parts and is positive in operation.

An additional object of this invention is to provide a system of control for a body operable in space which is compact in design and light in weight.

Another object of this invention is to provide a system of flight control for an aircraft which is selectively operable in one condition of operation to maintain the craft in coordinated flight and under another condition of operation to afford unlimited maneuverability of the craft.

It is also an object of this invention to provide a system of the class referred to in the preceding object which is controlled by a flight controller having three degrees of angular freedom corresponding to the principal control axes of the craft.

Yet another object of this invention is to provide a system of the character referred to involving gyroscopes in which the gyroscopes cannot tumble.

Still another object of this invention is to provide a system of the type mentioned in which velocity sensing gyroscopes are employed to detect velocities of motion about the three principal axes of control of the aircraft.

In another of this aspects it is an object of this invention to provide an improved lateral rate auto-pilot.

In connection with the preceding object it is an object hereof to provide an improved roll rate gyroscope assembly.

More specifically it is an object of this invention to provide a roll rate gyroscope having in addition to a roll-rate sense a selectively applied sensitivity to lateral accelerations and roll angle.

In still another of its aspects it is a further object of this invention to provide a flight control system for craft operable in space wherein the control system may always be utilized to control the craft regardless of the maneuverability requirements thereby functioning, in effect, as a power boost between a human pilot operated flight controller and the control surfaces.

More specifically, it is an object of this invention to provide a flight control system of the character referred to in the preceding object, wherein rate response to movement of a flight controller is obtained and power boost control of the craft's control surfaces is had.

In a generalized sense, it is an object of this invention to provide an aircraft flight control system selectively affording coordinated control of the craft and maneuver control of the craft from a flight controller.

Further to the preceding object, it is also an object of this invention to provide a flight controller for use in a flight control system for an aircraft, the movable member of which may be automatically positioned by the flight control system in accordance with the position of the standard or conventional controls of the craft.

In connection with the preceding object, it is also an object of this invention to provide a novel type of flight controller having three degrees of angular freedom.

More specifically it is an object hereof to provide a flight controller in which means are provided for detecting and/or indicating a given angular position in each of the three degrees of angular freedom.

A specific object of this invention is to provide a flight controller having magnetically operated detent means restraining angular movement of the movable member in a given position in at least one of the angular degrees of freedom.

Further to the preceding object it is an object of this invention to provide arrangements wherein during a coordinated turn the aircraft may be caused to climb or dive.

The foregoing statements are merely illustrative of the various aims and objects of this invention. Other objects and advantages will become apparent upon a study of the following specification when considered in conjunction with the accompanying drawings, in which:

Figure 1 is a diagrammatic illustration of a flight control system for a craft operable in space including certain of the novel features of this invention;

Figs. 2A and 2B together illustrate in detail the flight control system of this invention;

Fig. 8 is a detailed illustration of a sub-assembly of the movable elements of the flight controller;

Fig. 9 is a sectional view taken on the line IX—IX of Fig. 8;

Fig. 10 is a view of the right side of the sub-assembly shown in Fig. 8;

Fig. 11 is a top view of the roll-rate gyroscope of this invention;

Fig. 12 is a side view, fragmentarily in section, of the assembly of Fig. 11;

Fig. 13 is a view looking in at the right side of the assembly as seen in Fig. 11 with certain parts broken away;

Fig. 14 is a complete view looking in at the right side of the assembly of Fig. 11; and Fig. 15 is a sectional view of a type of magnetic biasing control arrangement for the bank rate gyroscope and which is typical of the biasing magnet system for all of the gyroscopes.

Figure 1:
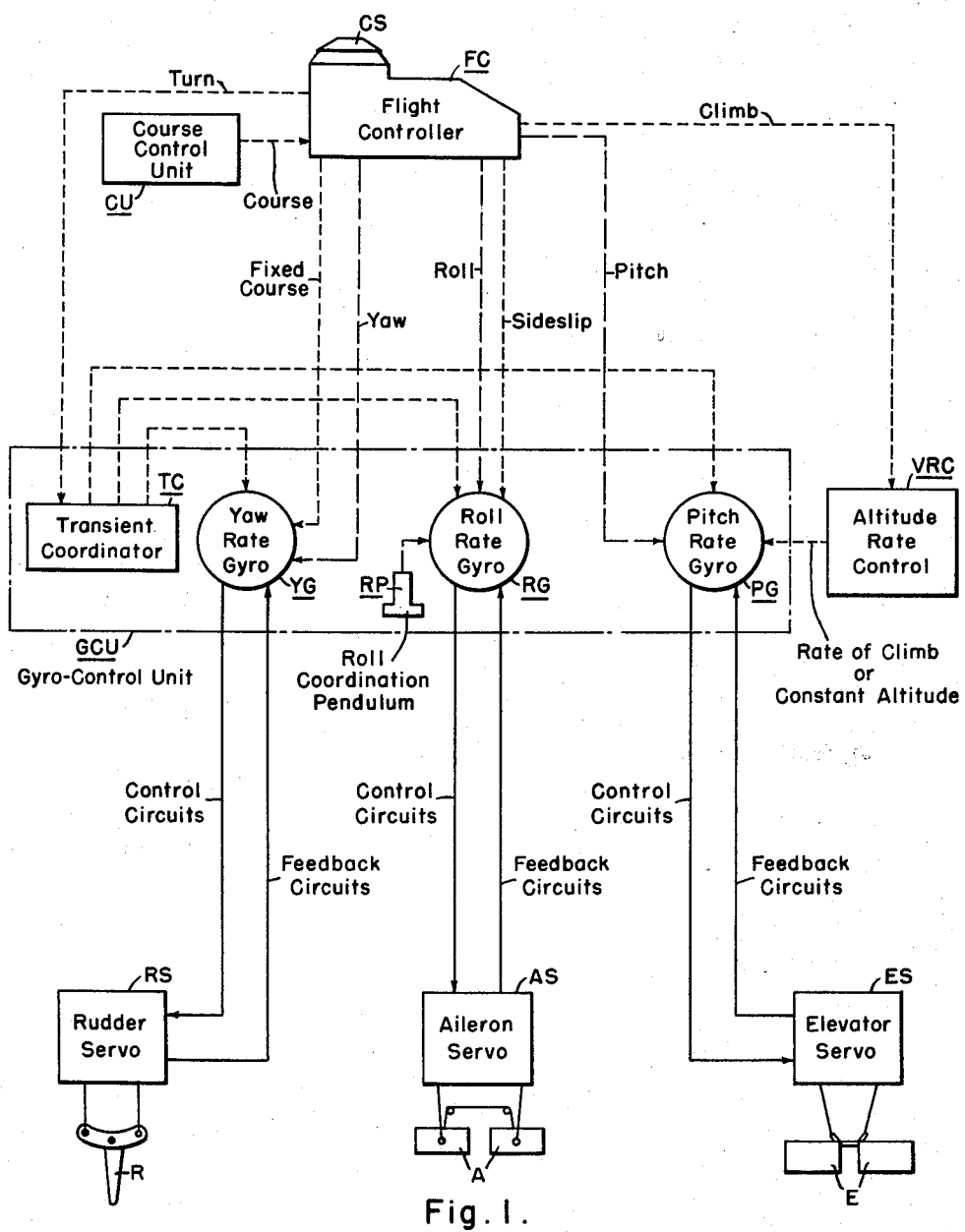

The automatic pilot system of this invention is diagrammatically illustrated in Fig. 1 and embodies a flight controller generally designated FC having a manually operated control stick CS which is mounted in the flight controller for three degrees of angular freedom. The respective modes of operation of the system, namely, Standby, Cruise and Boost, are established by means of a selector switch not shown in this figure in the interest of simplicity. The principal control connections in the Cruise mode of operation are indicated by the dotted lines between the respective system elements and the control connections in the Boost mode are indicated by the dash lines between the system elements. The solid lines represent circuits which function in both modes of aircraft control, namely, Cruise and Boost.

In the Cruise mode during fixed course operation, the system is controlled by the output of a course control unit generally designated CU. Through suitable control connections in the flight controller, the output of the course control unit is applied to a yaw rate gyroscope generally designated YG to control the output of this gyroscope and, hence, control the rudder in such a way as to hold the aircraft on a fixed course. The yaw-rate gyro YG may be of a type illustrated in U.S. Patent 2,638,288 which has been referred to hereinbefore. This gyroscope may be referred to as a single degree of freedom gyroscope being oriented on the aircraft in such a way as to respond, that is, precess about a single output axis, to angular velocity about the yaw axis of the craft. A suitable electrical pickoff on the gyroscope is utilized to control the rudder servo generally designated RS which in turn is mechanically connected to the rudder R of the craft.

The roll-rate gyroscope and pitch-rate gyroscope generally designated RG and PG are functionally similar to the yaw-rate gyroscope. The roll-rate gyroscope is oriented on the craft to respond to angular velocity about the longitudinal or roll axis and the pitch-rate gyroscope is disposed on the craft to detect angular velocity about the lateral or pitch axis. The output of the roll gyroscope controls an aileron servo AS which is mechanically connected to drive the ailerons A. Similarly the output of the pitch-rate gyroscope is connected to control an elevator servo ES which is mechanically connected to drive the elevators E of the craft.

As described in the Hanna patent aforesaid, the three rate gyroscopes are resiliently restrained about their respective precession axes which in each case constitutes the single degree of freedom of the gyroscopes. The precessional movement of the respective gyroscopes about their precession axes is maintained very small and this movement is detected by a suitable electrical pickoff. For instance, the contact type shown in the aforesaid patent to Hanna, or, any one of the well known resistive, inductive or capacitive types of pickoffs which may be found suitable.

In the instant arrangement in the Cruise mode of operation, if an error in course occurs without any change in the pitch or roll attitudes of the craft, the course error signal appears as a torque about the precession axes of the yaw gyroscope. This torque and the resulting displacement produces an electrical output at the electrical pickoff of the yaw gyroscope which actuates the rudder servo, and consequently the rudder, in such sense as to return the craft to the proper course. If no other system correction occurs at this time, the craft will execute a flat skidding turn back to the proper heading at which time the course error signal is reduced to zero and the rudder is returned to neutral position. While in the Cruise mode of operation, the three rate gyroscopes function essentially as velocity dampers with respect to movement about the respective control axis of the craft. Thus, angular velocity about any of the control axes is detected by the corresponding rate gyroscope and applied through the servo therefor to the proper control surface to check the angular velocity.

It will be appreciated that a velocity sensing arrangement such as this has no directivity sense. As a consequence, even though the threshold of response of the respective gyroscopes is quite low, it is possible over a period of time to accumulate angular position errors about the respective control axes of the craft which may result in lateral and vertical displacements. It is therefore desirable in the Cruise mode to introduce a sense in the yaw and roll channels which is indicative of departure of angular position of the craft from a given angular position about the control axis associated therewith and in connection with the pitch channel to introduce a sense indicative of the position of the craft in the vertical plane.

With the yaw rate gyroscope this is accomplished by biasing the gyroscope about its precession axis with a signal from the course control unit. With respect to the roll rate gyroscope this is accomplished by means of a horizontal pendulum which in the Cruise mode of control is physically connected to the roll gyroscope to introduce mass unbalance about the precession axis. Due to the orientation of the precession axis of the roll gyroscope which substantially parallels the yaw axis of the craft, the roll pendulum RP introduces a mechanical torque which is proportional to lateral acceleration of the craft and also proportional to the angular departure of the craft about the roll axis. The horizontal pendulum's gravitational response in straight and level flight indicates a departure of the wings of the aircraft from horizontal position and introduces a torque about the precession axis which results in control of the ailerons in such a way as to restore the lateral altitude of the craft to horizontal. If there is no turn rate during the interval when the lateral altitude is displaced from horizontal, some side slipping or skidding of the craft may exist. The lateral acceleration at the time side slipping or skidding occurs is detected by the roll pendulum RP, and further controls the ailerons to restore the lateral altitude to a horizontal position with a minimum of hunting.

Directivity in pitch is achieved by means of an altitude vertical rate control generally designated VRC, the output of which is utilized to bias the pitch-rate gyroscope PG about its precession axis. As will be described in greater detail hereinafter the VRC comprises an altitude chamber and an altitude-rate chamber. The outputs of these two chambers which are represented in mechanical deflections or forces are combined in a suitable electrical pickoff which in this embodiment controls the output of the pitch gyroscope PG.

In the Cruise mode of operation the altitude chamber is sealed at a given altitude and therefore contains air at a pressure corresponding to the selected altitude. Hence any departure of the craft from this altitude due to inadvertent changes in pitch altitude or for other reasons, displaces the craft into an air pressure level which differs from that trapped in the altitude chamber. The resulting electrical signal at the pickoff therefor is of such sense as to control the elevators E to return the craft to the proper altitude. The altitude-rate signal derived at the rate chamber acts as a damper in this mode of operation to minimize departures from and hunting of the proper altitude.

When in the Cruise mode of operation it is possible for the human pilot to override the autopilot by manipulation of the control stick CS at the flight controller. For example, if the human pilot should desire to change course, he need only rotate the control stick CS about the proper axis in order to achieve a coordinated turn. In the instant case the control stick is rotated about its vertical axis which is oriented in the craft to substantially parallel the yaw axis, to initiate a coordinated turn. The output signal developed at the flight controller due to this control stick rotation, is applied to a transient coordinator generally designated TC. This device which will be described in detail hereinafter in connection with Figs. 2A and 2B, produces two signals which are displaced in time phase in correspondence with the time delay of the craft in accumulating bank angle. The control is such as to produce a first signal of transient nature which is utilized through the roll channel to initiate aileron operation to start the aircraft rolling about its longitudinal axis. As this signal dies out, yaw and pitch signals are produced and utilized to control the yaw and pitch channels respectively to apply rudder in the proper direction and to apply up-elevator to introduce the required amount of pitch velocity for the instant angle of bank.

The respective magnitudes of these signals and their time phase relation depends primarily upon the time constants of the aircraft with respect to its respective control axis. These relationships may be established at the transient coordinator TC for a particular craft. The position of the flight controller FC commanding the coordinated turn indicates a particular turn-rate and rate regulation is obtained in each of the three degrees of freedom of the craft due to gyrodynamic response of the respective gyroscopes to the angular rates about the respective control axis of the craft. This response is opposed to the biases introduced about the precession axis of the respective gyroscopes by the outputs of the transient coordinator TC. When the oppositely acting torques, due to the biasing signals and the response of the gyroscopes to the angular rates, are in equilibrium, the turn is properly coordinated. In this operation skidding or side slipping is detected and corrected by the roll pendulum RP. In an analogous sense climbing or diving during the turn is prevented by the altitude-rate control VRC which is still connected to the pitch-rate gyroscope PG.

The control arrangement permits climbing or diving during a coordinated turn by moving the control stick CS of the flight controller FC in a second degree of freedom, namely fore or aft, in addition to that degree producing the coordinated turn. As an example, in the Cruise mode, if a climbing turn is desired, the stick is rotated about its vertical or yaw axis to produce the desired coordinated turn and pulled aft to introduce up-elevator in an amount exceeding that required to hold altitude constant in the turn. Control stick displacement from neutral about the pitch axis opens the altitude chamber to atmospheric pressure, removing the altitude control. The altitude-rate sense remains to regulate altitude-rate in correspondence with the position of the stick about its pitch axis.

In the Cruise mode when a turn is commanded at the flight controller FC by rotation of the control stick CS, provision is made by a suitable switching arrangement on the flight controller FC to disconnect the course control unit CU from the system and to establish suitable connections for causing the course control unit CU to act as a repeater and follow the changing heading of the aircraft. Hence, at such time as the control stick CU is returned to neutral position, the course control unit CU is reset for the new heading and, upon reconnection in the system holds the craft on the desired course.

Since it is possible to return the control stick to neutral position more rapidly than the aircraft will return to level flight, provision may be made to delay the connection of the course control unit CU a sufficient time to allow the craft to level off on the new course. Thus at the time the course control unit CU is reconnected, the craft is properly oriented for straight and level flight. Otherwise a few oscillations may occur as the course control unit CU attempts to orient the craft in yaw.

In the Boost mode of operation the instrumentalities imparting directivity to the respective channels are disconnected. This includes the course control unit CU, the roll pendulum RP and the vertical-rate control VRC. Additionally the transient coordinator TC is disconnected from the system. Hence, the respective autopilot channels are controlled only by the output of the respective output axes of the flight controller. In this arrangement rotation of the control stick CS about a vertical axis produces an output which controls the yaw channel. Rotation of the control stick about its lateral axis, that is fore and aft movement of the control stick CS (left and right as viewed), controls the pitch channel and lateral movement of the control stick CS about its longitudinal axis controls the roll channel. In this arrangement it will be appreciated that flight coordination depends upon the human pilot in much the same sense as when the pilot is flying the craft with the conventional or standard controls in the craft. If desired, the rate signal from the rate chamber of the vertical rate control VRC need not be disconnected from the pitch rate gyroscope. With such an arrangement, in the Boost mode of operation, fore and aft positions of the control stick CS will command rates of climb and dive rather than angular rates in pitch as is the case when the rate chamber is disconnected.

The foregoing discussion generally summarizes the two important operating modes of the system. These modes are selectable by a mode selector switch which is manually controlled by the human pilot. This switch and the circuitry associated therewith have not been shown in the diagrammatic illustration of Fig. 1 in the interest of simplicity. It will be understood however that before either of the above-described modes of operation of the system of Fig. 1 may be obtained that provision must be made for energizing the autopilot system and providing a warm-up period in which the various components of the system such as gyroscopes, generators and motors are brought up to operating speed and such electronic components as may be involved have been given sufficient time to be properly heated so that normal function may be obtained at the time the autopilot components are utilized. This warm-up interval is referred to herein as the Standby period and is obtained by movement of the mode selector switch from Off position to Standby position.

In the Standby mode of operation provision is also made for synchronizing the autopilot with the aircraft control surfaces. This is accomplished as will be described in detail at a later point by synchronizing the position of the control stick CS of the flight controller FC with the positions of the respective control surfaces in such a way that the position of the flight controller control stick CS corresponds to the command position of the control stick CS when the autopilot is functioning to achieve the instant control surface deflection. In accomplishing this in the present arrangement, provision is made through suitable motor means associated with the yaw and pitch axis of the flight controller to drive the flight controller FC in each of these two degrees of freedom in dependence of rudder and elevator deflection respectively. No attempt is made to synchronize the flight controller FC about its roll axis since the ailerons are used only to initiate roll velocity to accumulate a particular bank angle and are usually streamlined at the time the bank angle is accumulated. Thus this function differs from the control required about the yaw and pitch axis wherein for a coordinated turn at a given rate suitable yaw and pitch velocities must be maintained requiring deflection of both the rudder and the elevators in sufficient amount to produce the required yaw velocity for the instant angle of bank.

Figure 2B:
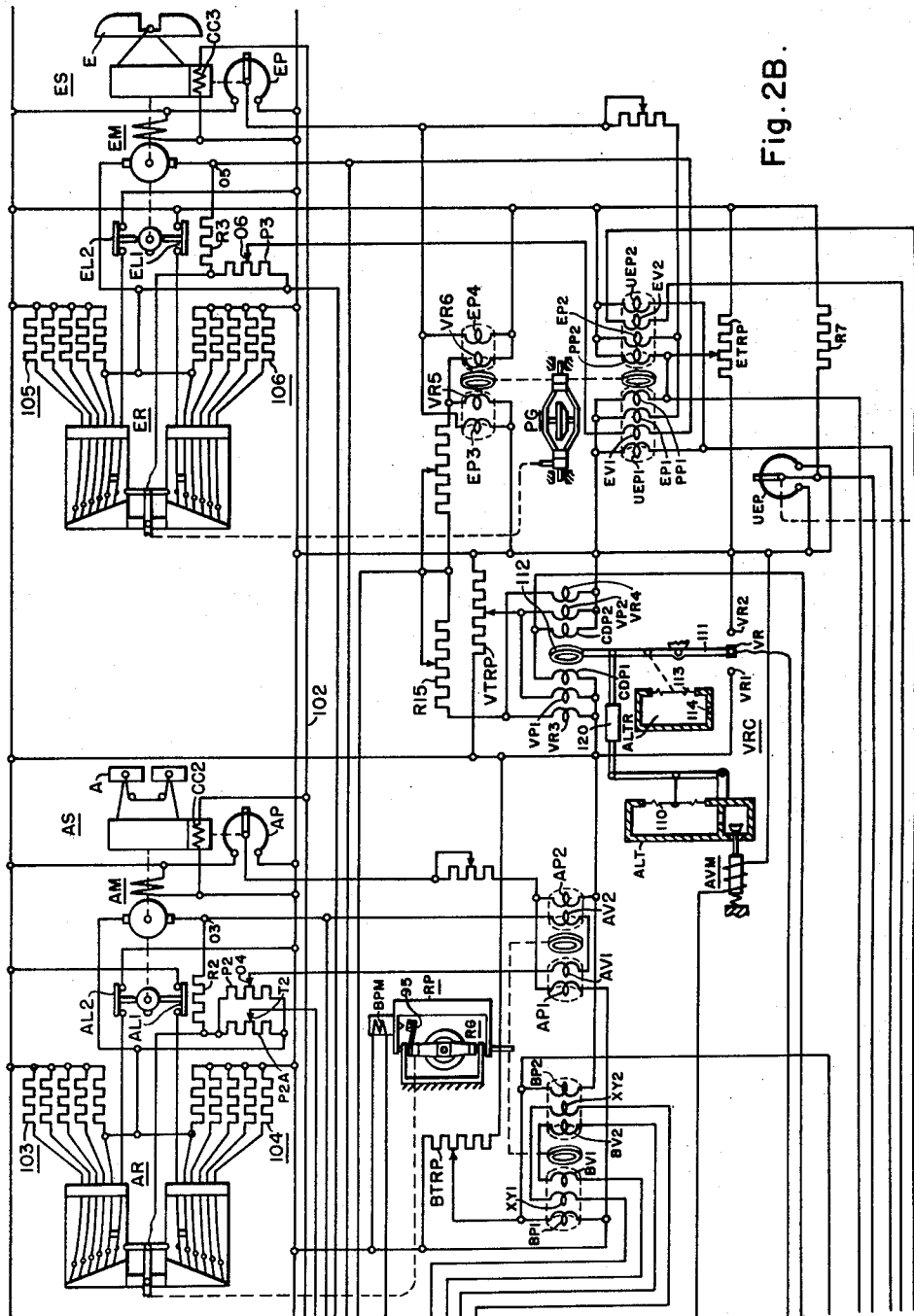
Figure 3:
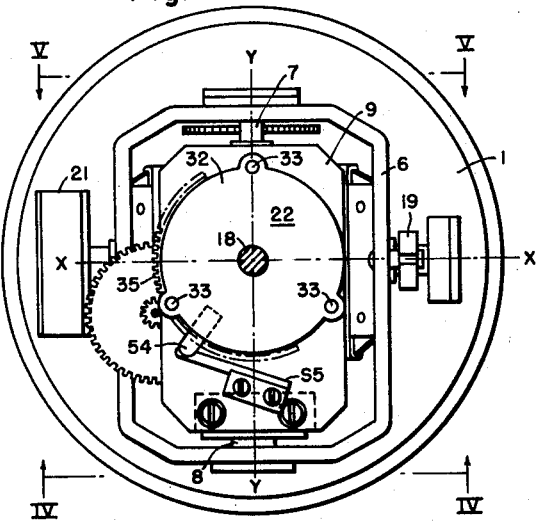
Fig. 3 is a top view of a flight controller with the cover removed of the type employed in the system of Figs. 2A and 2B.

Before proceeding with a detailed description of the system as illustrated in Figs. 2A and 2B, this invention will be better understood by considering the details of the flight controller and the details of the roll gyroscope assembly involving the detachable roll pendulum RP.

The details of the flight controller FC are illustrated in Figs. 3 through 10. These figures illustrate only the basic elements of the flight controller including the three degree of freedom mounting of the electrical pickoffs, the detent operated switches, the motors for driving the flight controller about its yaw and pitch axes and the magnetically operated center indicating detents for the yaw and pitch axis of the flight controller FC as well as the spring centering arrangement for centering the flight controller FC about its roll axis. Additional features normally incorporated in an arrangement of this type and which are housed in a chassis section usually integrally formed with the base include suitable indicators for indicating the control surface positions, trimming potentiometers for trimming the altitude of the craft about each of its three axes of freedom and switches for controlling certain functions of the system. Such components have been eliminated from the showing of structural details of the flight controller FC in the interest of simplicity.

As illustrated the flight controller FC comprises a generally circular base 1 upon which a pair of diametrically spaced vertical supports 2 and 3 are mounted. Bearings 4 and 5, defining a single bearing axis X—X, are mounted adjacent the upper ends of the respective vertical supports 2 and 3. A gimbal type frame 6 is journaled by bearings 4 and 5 for rotation about the bearing axis X—X and is provided with respective bearings 7 and 8 defining a bearing axis Y—Y which is substantially 90° displaced from the bearing axis X—X. Bearings 7 and 8 rotatably mount a second gimbal type frame 9 in which the control stick CS is journaled about an axis Z—Z which is perpendicular to the bearing axis Y—Y. The control stick CS is therefore arranged for three degrees of angular freedom in the bearing arrangement described having freedom of movement about all of the axes X—X, Y—Y and Z—Z. The respective axes X—X, Y—Y and Z—Z of the flight controller FC correspond to the roll, pitch and yaw axes of the aircraft and the arrangement of the flight controller FC in the system is such that movement of the control stick CS about the axis X—X or roll axis controls the ailerons A, that movement of the control stick CS about the axis Y—Y or pitch axis controls the elevators E and that rotation of the control stick CS about the axis Z—Z or yaw axis controls the rudder R of the aircraft.

Movement of the control stick CS about the respective axis described controls respective electrical pickoffs which are herein illustrated as potentiometer type pickoffs having movable taps actuated by movement of the control stick. In this connection movement of the control stick CS about the roll axis X—X actuates a tap 10 which is made of resilient spring material and provided with a contact at the lower end thereof which rides along an edge of bank potentiometer BP. The upper end of the resilient tap 10 is secured to a depending bracket 11 extending downwardly from gimbal 6. Hence tilting of the gimbal 6 about the roll axis X—X actuates the tap 10 along the arcuate edge of the bank potentiometer BP. The bank potentiometer BP is carried by means of supports 12 on the base 1 of the flight controller.

Figure 5:
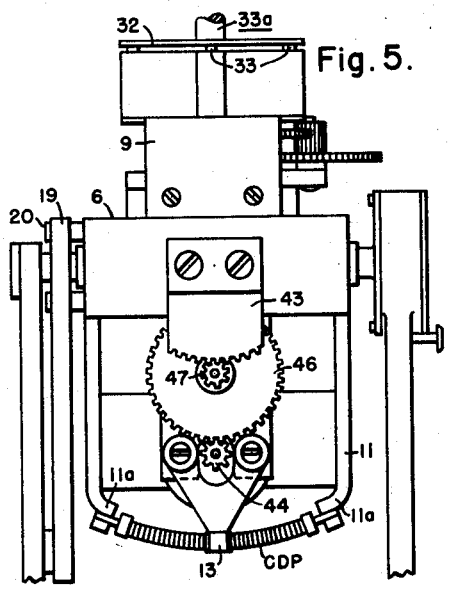
Fig. 5 is a fragmentary view of the movable components of the flight controller as seen looking in at the controller along the line V—V of Fig. 3.
Figure 4:
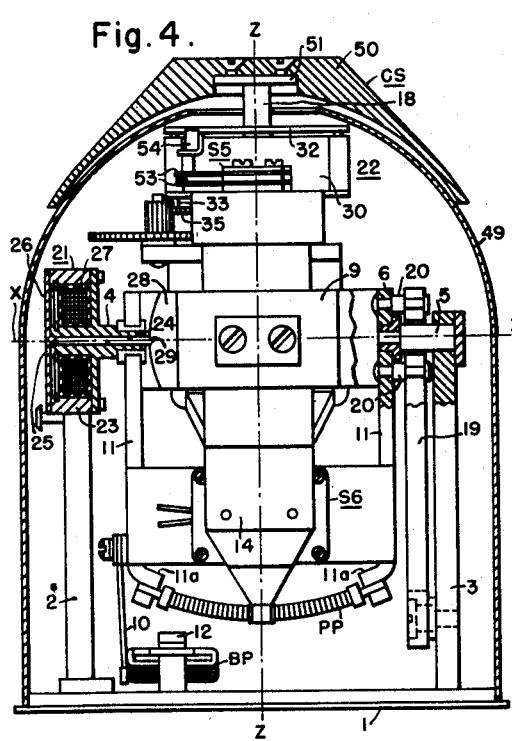
Fig. 4 is a sectional view taken on the line IV—IV of Fig. 3 and illustrating the cover and operating handle in position.
Figure 6:
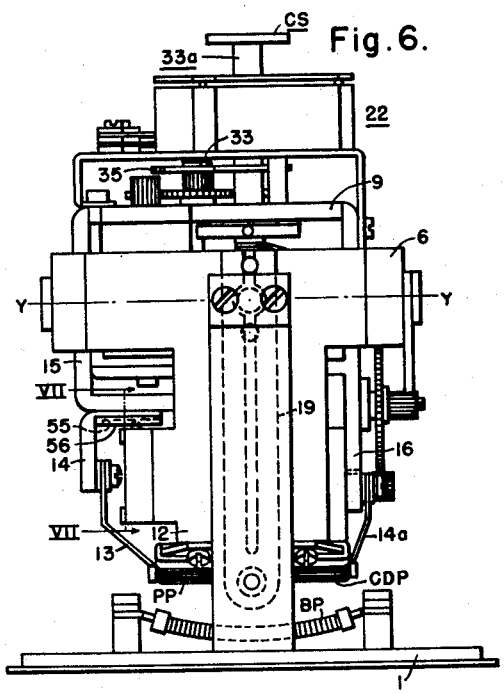
Fig. 6 is a view looking in at the right side of Fig. 4 with the cover removed.

A pitch potentiometer PP and a climb and dive potentiometer CDP are carried in side-by-side relationship as shown in Figs. 4, 5 and 6 on suitable tabs 11a integrally formed at the lower end of bracket 11. Pitch potentiometer PP is provided with a movable tap 13 and the climb and dive potentiometer CDP is provided with a movable tap 14a. Movable tap 13 is mounted at the lower end of an angle-shaped bracket 14 as seen in Fig. 6 which is secured to the bottom face of a bracket 15 depending from the gimbal 9. Hence, as the gimbal 9 is tilted about the pitch bearing axis Y—Y, the movable tap 13 is swept across the arcuate edge of the pitch potentiometer PP. A similar mounting is provided for a movable tap 14 of the climb and dive potentiometer CDP at the bottom end of a bracket 16 which also depends from the gimbal 9. Consequently, this tap is also actuated with the tap 13 upon movement of the control stick CS in such a sense as to rotate the gimbal about the pitch bearing axis Y—Y.

Turn potentiometer TPy as will be seen in Fig. 8 is secured between supports 17, only one of which is shown, which project upwardly from the depending bracket 15 of gimbal 9. The movable tap y of the turn potentiometer TPy is connected to and actuated by stem 18 of the control stick CS. The turn potentiometer is concentrically located with respect to yaw axis Z—Z and the contact tip of tap y sweeps along the arcuate edge of the turn potentiometer TPy.

With this arrangement rotation of the control stick CS about any one of its three axes of freedom selectively actuates the corresponding one of the potentiometer taps. At the same time the control stick CS may be moved in such a way as to simultaneously actuate all of the potentiometer taps in the required proportion, for instance, in the Boost mode of operation of the flight control system, to execute any maneuver within the capacities of the aircraft.

The neutral position of the control stick CS is indicated by suitable mechanical restraining means associated with each of the three axes of freedom. In connection with the roll axis X—X which is the only stick axis about which motor synchronizing is not provided, the neutral position is determined by means of a restraining spring 19 which is of generally U-shaped configuration as seen in dotted outline in Fig. 6. This spring is pivotally connected at its lower end to vertical support 3 and a pair of pins 20 which are mounted at diametrically disposed points on the gimbal 6 project between the forked extremities of the U-shape spring 19. Hence whenever the control stick CS is rotated about roll bearing axis X—X, the forked extremities of the U-shaped spring 19 are forced apart restraining the movement of the control stick CS. Whenever the force is removed from the control stick CS, the spring exerts a restoring force thereon to return the stick to the position indicated.

Such spring loading about the pitch and yaw bearing axes Y—Y and Z—Z is not provided but an indication of the neutral position of the stick about these respective axes is obtained by means of magnetically operated detents generally designated 21 and 22.

Magnetic detent 21 comprises a housing 23 of magnetic material which is disposed at the upper end of the vertical support 2 and has a portion forming the bearing 4 about which one end of gimbal 6 is journaled. A hole 24 which is concentric with roll axis X—X is provided in the housing 23 and is adapted to receive the stem 25 of the detent plunger, the outer end of which is provided with a plate 26 of magnetic material having a configuration corresponding to that of the housing 23. A coil 27 is disposed within the housing 23 and when energized produces a magnetic field which links the plate 26 attracting the plate towards the housing. This displaces the plunger 25 of the magnetic detent to the right, as viewed, engaging the pointed end of the detent plunger with the arcuate face of a plate 28 carried by the gimbal 9. The center of this arcuate face is about the axis Y—Y and a suitable recess 29 is provided in this arcuate face to receive the pointed end of detent plunger 25. The force of engagement of the detent plunger 25 with recess 29 and the slope of the recess face is such that the human pilot may easily move the control stick CS about the pitch axis Y—Y through the detent position, but the restraint afforded at the detent position is such as to positively indicate to the human pilot the neutral position of the stick about the Y—Y axis.

The magnetic detent arrangement associated with the yaw axis Z—Z is similar in principle to that associated with the pitch axis Y—Y and involves a magnetic housing 30 through which the stem 18 of the control stick CS is fitted. This magnetic housing is adapted to receive an annular coil 31 which when energized produces a magnetic field linking a vertically displaceable magnetic plate 32 which is supported at the upper ends of a plurality of pins 33 (see Figs. 3 and 8) which are slidably mounted in suitable holes 33a in the magnetic housing 30. One of the pins, namely the pin 33 seen in Fig. 8, projects through the bottom of the magnetic housing 30 and clears through a bracket 34 which mounts the magnetic housing 30 on the upper side of gimbal 9 and is adapted to ride against the upper face of a sector gear 35 which is secured to the stem 18 of the control stick. The upper face of gear 35 is provided with a recess 36 adapted to receive the lower pointed end of pin 33 to thereby indicate the neutral position of the control stick about the yaw axis Z—Z.

The synchronizing motor drives for the control stick CS about its yaw and pitch axes, namely the axes Z—Z and Y—Y, comprises respective motors TSM and PSM. In the interest of simplicity the details of these motors have not been illustrated, however, these may be small permanent magnet field, direct current motors which are reversible in direction of rotation by reversing the armature terminal voltage. The turn synchronizing motor TSM is mounted beneath the upper plate of gimbal 9 with its rotor axis vertical. A clearance hole is drilled through the upper plate of gimbal 9 to clear a pinion 40 which is connected or mounted on the motor shaft. The pinion 40 meshes with a gear 41 having a small pinion 42 concentrically secured thereto. Small pinion 42 meshes with gear sector 35 which as previously described is connected to the stem 18 of the control stick CS, which completes the drive for the control stick CS about its vertical yaw axis Z—Z.

The pitch synchronizing motor PSM is mounted on the inner face of the depending bracket 16 which is carried by the gimbal 9. The axis of rotation of motor PSM is substantially at right angles to that of the turn synchronizing motor TSM and pinion 44 which is mounted on the shaft of the pitch synchronizing motor clears through a suitable opening 45 in the depending bracket 16. Pinion 44 meshes with a gear 46 having concentrically mounted thereon a pinion 47 meshing with a gear sector 48 concentrically mounted with respect to the pitch axis Y—Y on gimbal 9. The pitch motor PSM therefore swings with the gimbal 9 about the Y—Y bearing axis.

In operation, when in neutral, the flight controller FC is preferably although not necessarily oriented in the craft with the roll axis X—X paralleling the longitudinal or roll axis of the craft, with the pitch axis Y—Y paralleling the pitch axis of the craft and with the yaw axis Z—Z paralleling the yaw axis of the craft. In the system, rotation of the control stick CS about the yaw axis Z—Z actuates the tap $y$ of the turn command potentiometer TP$y$ producing the turn command signal which is utilized to control the rudder R. Rotation of the control stick CS about the pitch axis Y—Y actuates the pitch and climb and dive potentiometers PP and CDP, respectively, to introduce the pitch command signal to the system and, rotation of the control stick CS about the roll axis X—X actuates the bank potentiometer BP to introduce the roll command signal into the system.

The stick mechanism is enclosed by a housing 49 having a hemispherical top provided with an opening to clear the stem 18 of the control stick CS and a control knob 50 of generally cupped shaped configuration to fit over the hemispherical upper surface of cover 49 is screwed to a flange 51 at the upper end of the stem 18 of the control stick to complete the control stick assembly. Control knob 50 is of suitable external configuration to receive the palm of the pilot's hand and is of such size that the tips of the pilot's fingers may ride over the edge of the control knob and contact the surface of cover 49 which steadies the pilot's operation of the control stick.

The switching function for disconnecting the course control unit CU and the vertical rate control system VRC from the autopilot system as described in connection with Fig. 1, is initiated in respective detent switches generally designated S5 and S6. These switches may be of any suitable type capable of actuation from the small movement afforded by movement of their operators in and out of the detent notches provided for their operation. Moreover the switches must require a minimum of mechanical force for operation such that movement of their actuators through detent position imposes a negligible load on the gimbal system of the flight controller so that no difficulty is encountered by the synchronizing motors TSM and PSM in driving the yaw and pitch gimbal systems of the flight controller through the switch detent positions during the Standby mode of operation of the system.

The yaw detent switch S5 is actuated by vertical movement of the magnetically operated detent assembly 33$a$ as it moves back and forth through detent position. Switch S5 comprises a pair of normally open leaf spring contacts 53 which are moved to closed position by a bracket 54 depending from the plate which carries the detent pin 33. Inasmuch as the system provides for energization of the electromagnet of the yaw detent 22 on the flight controller FC during the Cruise and Boost modes of operation sufficient force is available to close the contacts 53 whenever the control stick CS is in neutral position in yaw, that is when the control stick CS is in yaw detent. The closing of the contacts 53 as will be described at a later point establishes a circuit whereby the course control unit CU may be disconnected from the autopilot system.

Figure 7:
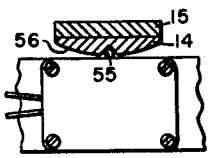
Fig. 7 is a fragmentary detail showing a detent operated switch forming a part of the flight controller.

The pitch detent switch S6 may be a commercially available light duty plunger operated switch which is normally spring biased closed. Hence, when the control stick CS is in pitch detent, provision is made through a recess 55 in the arcuate face 56 of bracket 14 to permit the pitch detent switch S6 to close. When the pitch detent switch is closed, the flight controller control stick CS is centered indicating that the craft is in level flight. This establishes suitable circuits which seal the altitude chamber of the vertical rate control VRC to trap air therein at a pressure corresponding to the instant altitude of the craft so that in the Cruise mode of operation the aircraft may be maintained at that altitude. The details of the pitch detent switch assembly are best illustrated in Figs. 6 and 7.

Figs. 11 through 15 illustrate the details of the roll gyroscope RG. This assembly comprises a main frame 58 of substantially channel shaped cross-section and of rectangular plan-form as best seen in Fig. 12. Bearings 59 and 60 disposed in coaxial relationship in the bight portions of the top and bottom channel sections of the frame 58 journal a gimbal 61 affording a vertically disposed pivot axis for the gyro gimbal. A hysteresis motor driven gyro rotor 62 is journaled in the gyro gimbal 61 about a bearing axis substantially perpendicular to the axis defined by bearings 59 and 60. This latter axis is the rotor spin axis of the gyroscope while the axis defined by bearings 59 and 60 is referred to as the precession axis of the gyroscope. In practice, this roll gyroscope is installed in the aircraft with the precession axis substantially paralleling the yaw axis of the aircraft and with the rotor spin axis occupying a position in a plane substantially paralleling the pitch axis of the aircraft. Hence upon rotation of the aircraft about its longitudinal axis the rotor spin axis is angularly displaced and the gyro precesses in an attempt to align the rotor spin vector with the input torque vector in a direction determined by the direction of rotation of the gyroscope rotor with respect to the direction of the input torque.

Precessional movement of the roll gyroscope RG actuates a prod 63 which is carried by the gyro gimbal 61. Prod 63 constitutes the actuator of an aileron regulator electrical pickoff generally designated AR. This electrical pickoff comprises a pair of oppositely disposed stacks of normally open leaf spring contacts generally designated 64 having the actuator 63 disposed therebetween. Hence, upon precessional movement of the roll gyroscope RG in one direction or the reverse, the contacts 64 are selectively operated. These contacts control the aileron servo system yet to be described. The aileron regulator contacts are mounted between the sides of the channel section of frame 58 on the right side of the frame assembly as viewed in Fig. 12.

Means for applying torques about the precession axis of the roll gyroscope RG are provided therein. Such means are represented in the respective biasing magnet assemblies 66 and 67 which are mounted on the extremities of a support 67$a$ on opposite sides of the main frame. Each biasing magnet assembly comprises a pair of oppositely disposed electromagnets respectively designated 68, 69 and 70, 71. The respective assemblies are arranged in suitable housings secured in coaxially opposed relationship by means of respective clamps 72 and 73 forming part of the support 67$a$.

The details of one biasing magnet assembly, for example, that designated 66, appear in Fig. 15. Each electromagnet comprises a cylindrical housing 75 which is engaged by a clamp 73. Such housing is provided with a concentric core section 76 provided with an enlarged circular end 77 which is utilized to secure the respective coil assemblies 78 against movement. The circular extremities 77 are disposed in spaced confronting relationship and an annular armature 79 which is connected to the gimbal 61 by means of an arm 80 is supported in concentric relationship about the circular end sections 77 and straddling the airgap therebetween. The armature airgap 81 which is measured radially between the inner face of the armature 79 and the adjacent circular end sections 77 is appreciably smaller than the airgap between the confronting ends 77 of the circular end sections so that the reluctance at the armature airgap is considerably lower than that between the confronting faces of the circular end sections 77. The outer peripheral face of the annular armature is correspondingly radially spaced from the inner peripheral face of the housings 75 and straddles the airgap between the confronting edges of the housings. The same relationship exists here between the radial airgap and the axial housing airgap so that lower reluctance exists across the radial airgap. Thus the main flux tends to circulate across the respective radial airgaps rather than between the axially spaced faces of the respective cores 76 and housings 75 of the magnet system.

Although the displacement of the armature is of an angular nature about the precession axis of the gyroscope, the movement of the gyroscope about its precession axis is limited to such a small value that the armature motion may be construed to be essentially axial of the longitudinal axis of the electromagnet assembly. From this it will be appreciated that the radial airgap dimensions associated with either of the electromagnets is substantially unchanged by movement of the armature and the variation in magnet pull is practically independent of armature displacement. The biasing torques associated with either electromagnet are made a linear function of coil current by means of a polarizing flux and therefore do not follow the square law relationship which exists with conventional unpolarized arrangements. As the consequence the magnet pull is linear with respect to coil currents and, hence, is linear with respect to operation of such instrumentality as may be controlling the coil current, minimizing calibration problems in the biasing control of the gyroscope assembly. Similar biasing schemes are utilized on the yaw and pitch gyroscopes in the control system.

Roll pendulum RP comprises a substantially rectangular mass 85 as seen in Fig. 13 which straddles the vertical and lateral dimensions of frame 58 and is provided with a pair of support arms 86 and 87 which are pivotally mounted on bearing extensions 88 and 89, respectively, of bearings 59 and 60. As will be seen from the geometry of the roll pendulum, the center of gravity is removed from its axis of pivoting which, as noted hereinbefore, substantially parallels the yaw axis of the aircraft. As a consequence the roll pendulum will sense lateral acceleration of the aircraft and upon tilting of its pivot axis from the vertical position, as by roll displacement of the aircraft and in the absence of centrifugal force, will rotate about the vertical axis under the influence of gravity. Hence if the aircraft is in a turn which is not properly coordinated and slipping or skidding occurs, the roll pendulum RP will respond to the components of gravity and lateral acceleration acting thereon, in a direction depending upon the resultant of these different forces.

Provision is made herein for detachably securing the roll pendulum RP to the gyro gimbal 61. In accomplishing this, an electromagnet assembly comprising a housing 91, depending through a suitable opening in pendulum support arm 86, houses a coil 92 through the center of which a core 93, having a pointed bottom end, projects. The bottom end of housing 91 is disposed in closely spaced relationship with an armature 95 carried by a spring 96 which is secured to rotate with gyro gimbal 61. Armature 95 is provided with a tapered recess 97, the faces of which have a slope corresponding to the slope of the face of the pointed end of core 93. When coil 92 is deenergized, spring 96 maintains the spaced relationship between the armature and the core indicated in Fig. 12 and hence the pendulum is disconnected from the gyro gimbal 61. When coil 92 is energized the armature is drawn upwardly as viewed seating the pointed end of core 93 in recess 97 thus locking the roll gyro gimbal to the roll pendulum. Thus the forces of the pendulum are combined as torques with the precession torque of the gyroscope and utilized in controlling the actuator 63 of the aileron regulator pickoff arrangement.

The roll gyroscope RG with its attachments including actuator 63 and armature 95 as well as the armatures of the biasing magnets 72 and 73 is balanced about its precession axis so that the effects of gravity and lateral acceleration are neutralized. This is the condition in which the roll gyroscope RG is utilized in the Boost mode of operation of the autopilot system. In the Cruise mode of operation the electromagnet is energized which connects the roll pendulum to the gyro gimbal 61 to introduce the effects of the pendulum in obtaining coordinated control.

In the autopilot system illustrated in Figs. 2A and 2B the application of the flight controller FC and the roll gyroscope RG is diagrammatically illustrated. In these illustrations particularly with regard to the flight controller FC the essential components are illustrated at convenient points in the circuit network and the connection of such components with the respective axes are indicated by dotted lines representing the mechanical connections.

The system is designed for operation from the power supplies available on modern aircraft. In this connection the gyro motors and certain of the synchro elements utilized in the course control system are adapted for operation from a 400-cycle three-phase alternating current supply system. Some synchro elements and a discriminator circuit utilized in the course control unit are adapted for operation from a 400-cycle, single phase, 115 volt alternating current supply circuit. The servo system and control circuits are designed for operation from standard D.C. supplies which are available. It should be noted at this point that the system insofar as control circuit components and servos are concerned is merely representative of one class of equipment which may be utilized in such an arrangement. For instance, instead of the electric servos indicated, electrically controlled hydraulic servos may be employed for actuating the control surfaces of the aircraft. Similarly, while the system has been illustrated as being connected to a direction detector such as a flux valve compass system, or other similar system, it will be appreciated that modifications may be made adapting the system to control signals from radar equipment for automatic tracking purposes and from suitable radio equipment of the type employed, for example, in instrument landing systems.

The system herein disclosed is essentially a three-channel arrangement in which each input may be regarded as the biasing system of the respective yaw, roll and pitch gyroscopes and the outputs represented in the outputs of the respective servos for driving the rudder, the ailerons and the elevators respectively.

For the purposes of this discussion the direction of flight of the aircraft may be considered as from right to left, as viewed in Figs. 2A and 2B. For the particular orientation of the gyroscopes indicated, the yaw axis of the craft occupies a position in the plane of the paper at right angles to the line of flight or longitudinal axis, and, the pitch axis of the craft which is disposed laterally of the aircraft occupies a position substantially perpendicular to the plane of the paper. As earlier indicated for the purpose of analysis, these axes are presumed to be mutually perpendicular.

Although the gyroscopes in this diagrammatic illustration of the system are separated, in practice it is customary to mount them on a single platform in the angular relationships indicated. This unit assembly of the gyroscopes therefore forms a small compact assembly which may be properly oriented on the aircraft at some convenient location where space is available.

Circuit protective devices such as fuses and circuit breakers and items such as power control switches and power supply units have been left out of the illustration in the interest of simplicity, the circuitry shown constituting the essential basic circuitry of the autopilot of this invention.

The autopilot is controlled by means of a mode selector switch which is generally designated MSS. This switch may be any suitable commercially available switch and is illustrated herein as comprising respective contact segments which are rotatably mounted and which selectively control the closing of switches SW1, SW2 and SW3 which establish the respective operating modes. Switch MSS is a four-position switch operable through the four positions indicated including Off, Standby, Cruise and Boost.

In the Off position of the mode selector switch MSS the autopilot circuits are completely deenergized and the craft, if in flight, is completely under the control of the conventional controls provided in the aircraft.

In the Standby position switch SW1 is closed which energizes a standby switch generally designated SS closing its normally open contacts PS and GS. Contacts PS are the power contacts which apply direct current power to the autopilot circuits and GS is a gyro switch which applies alternating current to a single phase to three phase converter PC constituting the three phase power supply, the output of which is applied to the motors driving the respective gyroscope rotors. The output circuit connections are not shown in the interest of simplicity. Closure of switch GS also applies alternating current to components of the course control unit CU.

In the Cruise position of the mode selector switch MSS, contacts SW2 are closed which energizes the coil of the coordinated control switch generally designated CCS. This switch is provided with a pair of normally closed contacts respectively designated ESS and TSS. The first of these is termed the elevator synchronize switch and the second is termed the turn synchronize switch. In the Standby position, when the switch CCS is deenergized, these contacts establish energizing circuits for the turn synchronize motor TSM and the pitch synchronize motor PSM of the flight controller, the details of which will be described at a later point.

In the Boost position of the mode selector switch MSS the remaining set of contacts SW3 are closed. This completes an energizing circuit for the coil of a maneuver switch generally designated MS. This switch is equipped with normally closed contacts ACS comprising the altitude cut-out switch and which are utilized in the Boost mode to deenergize the coil of the attitude valve magnet AVM which is spring biased to open the altitude chamber ALT to the atmosphere. Normally closed contacts VRCS comprising the vertical rate control switch are open when the maneuver switch MS is energized. This opens the biasing circuit and output circuit of the vertical rate control VRC to effectively disconnect the vertical rate control function from the autopilot system. The normally closed contacts of the bank pendulum switch BPS are open in the Boost mode deenergizing the bank pendulum magnet BPM which disconnects the roll pendulum RP from the roll gyroscope RG. Opening of the contacts of maneuver turn switch MTS1 disconnects the transient coordinator TC from the roll gyro biasing coils $xy1$ and $xy2$, while closing of maneuver turn switch contacts MTS2 connects the output of the turn potentiometer TPy directly to coils TP1 and TP2 of the biasing magnet system of the yaw gyroscope YG. Opening of contacts DRS of the delay rudder switch disconnects the transient coordinator TC from yaw gyro biasing coils $xz1$ and $xz2$. Opening of the contacts of the up elevator switch US disconnects the transient coordinator drive for the up elevator potentiometer UEP and, hence, removes the transient coordinator's control of the elevators, and closing of the contacts of bank switch BS shunts resistor R11 in the circuit for roll gyro biasing coils BP1 and BP2 to increase their sensitivity to the bank potentiometer BP.

Considering now the respective channels of the autopilot, the yaw channel includes the yaw gyroscope YG having a polarized biasing magnet system of the type illustrated in Fig. 15 and described in connection with the detailed description of the roll gyroscope. This gyroscope is provided with a plurality of biasing coils through which various command signals and feedback signals are fed to produce control torques about the precession axis thereof. These coils are all adapted for direct current energization in circuits extending across the direct current supply conductors respectively designated B+ and B−.

The rudder servo includes a rudder regulator electrical pickoff generally designated RR having leaf spring type contacts as described in connection with the detailed description of the roll gyroscope RG presented hereinbefore. The respective leaf spring contacts of this assembly are connected in series with the respective resistors of groups 100 and 101. The resistors of groups 100 and 101 are connected in parallel with opposite sides of the direct current power supply system and are connected to control the polarity and the degree of excitation of a rudder motor circuit controlling the armature excitation of rudder motor RM. The field RF of the rudder motor RM as will be observed is connected directly across the direct current power supply and, hence, is furnished with constant excitation. Consequently, the speed and direction of rotation of the rudder motor RM are determined by the magnitude and polarity of the voltage applied across the armature terminals of the rudder motor. The rudder motor RM is mechanically connected to drive the rudder R through a suitable mechanical linkage which may include a conventional cable drum arrangement or other suitable drive used in connection with electric type servos. Normally this mechanical drive between the rudder motor and the rudder is disconnected. When the mode selector switch MSS is in both the Off and Standby positions and is not connected until such time as the mode selector switch is moved to Cruise position. When mode selector switch MSS is in Cruise position the contacts SW2 complete a connection between the B+ conductor of the direct current power supply and conductor 102 to which one side of the coil CC1 of a clutch in the rudder drive is connected.

The rudder motor RM is connected as one leg of an electrical bridge circuit including resistor R1 in an adjacent leg. The tapped portions of potentiometer P1 constitute the remaining adjacent legs of this bridge circuit. The output terminals of the bridge circuit are represented in terminals O1 and O2 the latter of which is the tap on potentiometer P1. Voltage of one polarity or the reverse is applied across the terminals of potentiometer P1 by the rudder regulator pick off RR. The magnitude of the voltage so applied is determined by the magnitude of deflection of the flexible contacts which are successively engaged upon increasing deflection to successively insert resistors 100 or 101, in parallel in the energizing circuit for the bridge across the supply conductors B+ and B−. The details of this circuit are not discussed in this application since they are not essential to an understanding of this invention. Further information on these details may be found in a copending application of C. R. Hanna et al., Serial No. 785,985, filed November 14, 1947 and entitled Control Systems for Dirigible Craft, now U.S. Patent No. 2,656,134.

The rudder motor bridge circuit is electrically balanced against the D.C. resistance of the rudder motor armature when the rudder motor RM is not running. When a voltage is applied across the input terminals of the bridge circuit, the rudder motor RM begins to rotate to deflect the rudder of the aircraft. When this occurs, the counter-electromotive force increases which increases the effective D.C. resistance of the rudder motor armature, the voltage across the rudder motor armature being approximately proportional to motor speed. Consequently, the bridge unbalance voltage appearing across output terminals O1 and O2 is approximately proportional to rudder motor speed and the polarity of the voltage depends upon the direction of rotation of the rudder motor. Therefore, the bridge unbalance voltage may be referred to as a velocity voltage since it has the components of magnitude and sense of direction of rotation. This voltage is used to stabilize the rudder motor loop by its connection to coil RV1 of the yaw gyro biasing magnet system which controls the output of the yaw gyro in such a way as to damp the operation of the rudder motor.

The yaw gyro YG is further controlled in dependence of a voltage indicative of rudder position. Such a voltage may be detected either by an electrical pick-off actuated directly from the rudder motor drive as shown or, may be produced by a pick-off geared directly to the rudder motor. The pick-off herein shown is a potentiometer RP, the tapped portions of which are connected as adjacent legs of a bridge circuit and the remaining two legs of which respectively include coils RP1 and RP2 of the yaw gyro biasing magnet system. This bridge circuit is energized across the direct current power supply conductors B+ and B—. Thus, both velocity and position feedback signals are applied in the rudder motor regulator loop to provide adequate control.

Limits are imposed on the magnitude of rudder deflection by means of respective limit switches RL1 and RL2 which are geared in the rudder motor drive in such a way as to be selectively opened by the cam actuator therefor when the extremes of rudder deflection are reached. The switches are connected in the energizing circuits for the rudder motor bridge circuit and consequently, when opened, deenergize the rudder motor.

The yaw gyro biasing magnet system is additionally controlled by a magnet polarizing voltage taken from the tap of rudder trim potentiometer RTRP, the tapped portions of which are connected as adjacent legs of an electrical bridge circuit connected across the direct current power supply conductors B+ and B—. The remaining adjacent legs of this bridge circuit are formed by respective biasing magnet coils XZ1 and XZ2. Coils XZ1 and XZ2 are additionally energized by voltage appearing between an adjustable tap $x$ of a potentiometer TP$x$ and the source terminals B— and B+, respectively. This potentiometer comprises a portion of a transient coordinator TC yet to be described, and the tapped portions of potentiometer TP$x$ and the coils XZ1 and XZ2 form adjacent legs of an electrical bridge circuit energized by the direct current power supply. The voltage appearing at the tap $x$ is time delayed, as will be explained, with respect to a voltage applied to control the ailerons of the craft in order to delay or suppress rudder deflection until such time as bank angle has been accumulated.

Yaw gyro biasing magnet coils TP1 and TP2 are connected in adjacent legs of a bridge circuit including the tapped portions of a turn potentiometer TP$y$ which, as earlier described herein, is actuated by rotation of the control stick CS of the flight controller FC. The voltage at adjustable tap $y$ of the turn potentiometer controls the relative magnitudes of excitation of biasing magnet coils TP1, TP2, TP3 and TP4 depending upon the direction of unbalance of the bridge circuit by movement of the adjustable tap $y$. These coils in addition to applying biasing torques also polarize the yaw gyro biasing magnet system.

Coils SV1 and SV2 are connected in series across the output terminals O3 and T2 of an electrical bridge circuit including the armature winding of aileron motor AM. This bridge circuit includes a resistor R2 as an adjacent leg in the bridge with the armature of the aileron motor AM and the remaining adjacent legs of this bridge circuit are represented in the tapped portions of a potentiometer P2A having the tap T2. This bridge circuit is similar to that described in connection with the rudder servo motor RM and is normally balanced when the aileron servo motor AM is not running. The voltage appearing across the output terminals O3 and T2 and which energizes coils SV1 and SV2 of the yaw gyro YG, is, therefore, a voltage proportional to the velocity of the aileron servo motor AM. The control of the yaw gyro output afforded by coils SV1 and SV2 is arranged to minimize skidding or side slipping of the aircraft due to insufficient application or over-application of the rudder R. This voltage is referred to herein as a skid voltage which tends to coordinate the movement of the aircraft about its yaw and roll axes to produce a coordinated turn.

The turn synchronize motor TSM, which drives the control stick CS about its yaw axis in the Standby mode of autopilot operation, is connected in parallel with the armature of the rudder motor RM during the Standby mode of operation by the normally closed turn synchronize switch TSS which is on the coordinated control switch CCS. Motor TSM has its armature winding connected as an adjacent leg in an electrical bridge circuit with resistor R10. The remaining two legs of which are represented in the tapped portions of a resistor R11. This bridge circuit, as in the case of the rudder servo motor bridge circuit, is electrically balanced against the D.C. resistance of the armature winding of the turn synchronize motor TSM, when the turn synchronize motor TSM is not running. Consequently, the output of this bridge circuit, which is applied to coil TSD of the yaw gyro biasing magnet, is proportional to the velocity of operation of the turn synchronize motor TSM and is fed into the regulator loop of the rudder motor to act as a damping control therein. Inasmuch as the turn synchronize motor TSM is responsive to the rudder motor armature voltage, this damping control stabilizes the follow-up operation of the turn synchronize motor TSM in the Standby mode of operation.

Coils CU1 and CU2, which are the remaining coils of the yaw gyro biasing magnet system are polarized by coils TP3 and TP4 on the lower magnet and are energized by the electrical output of the course control unit generally designated CU. The control of yaw gyro output afforded by coils CU1 and CU2 adds a position or directivity sense to the velocity sense of the yaw gyro YG tending to maintain a control on the rudder of the aircraft such as to hold the craft on fixed course during the Cruise mode of autopilot operation. The details of the course control unit CU will be explained at a later point.

Continuing the discussion of the three channels of the autopilot, the aileron channel includes the roll gyro RG, the output of which is sensed by the aileron regulator electrical pick-off AR as indicated by the mechanical connection thereof with the precession axis of the roll gyro RG. The aileron regulator pick-off, as in the case of the rudder regulator pick-off, includes the respective groups of control resistors 103 and 104 which are selectively connected in parallel in the power supply circuit for the aileron servo motor bridge circuit. The function of this circuit will be understood in connection with the above description of operation of the rudder servo motor bridge circuit. The output of the aileron servo motor AM is connected mechanically to the drive for the aileron A. This drive is controlled by a clutch having a coil CC2 which, like the rudder servo clutch CC1, also depends for its energization upon energization of conductor 102.

As in the case of the yaw gyro biasing magnet system, both velocity and position feedback from the aileron motor drive are applied to biasing coils of the roll gyro biasing magnets. The velocity signal represented in the unbalance of the aileron servo motor bridge circuit and which appears across output terminals O3 and O4, is applied to series connected roll gyro biasing coils AV1 and AV2. The position feedback is obtained from the output of an electrical bridge circuit including the tapped portions of potentiometer AP, the tap of which is actuated by the aileron drive. The remaining adjacent legs of this bridge are represented in roll gyro biasing coils AP1 and AP2, and the bridge is connected across the direct current power supply conductors B+ and B—. The relative magnitude of excitation of coils AP1 and AP2 depends upon the position of the tap of potentiometer AP.

Polarization and balance trimming of the roll gyro biasing magnet system is obtained by suitable excitation of coils BP1 and BP2 forming adjacent legs in a bridge circuit energized across the direct current power supply and having for its remaining adjacent legs the tapped portions of a bank trim potentiometer BTRP.

A coordinating control voltage from the transient coordinator TC, during the Cruise mode of autopilot operation, is applied to series connected coils XY1 and XY2 connected between the taps $x$ and $y$ of potentiometers TP$x$ and TP$y$ which are connected in bridge circuit relationship and in which the taps $x$ and $y$ represent the output terminals. This latter bridge circuit is also energized by the direct current power supply.

A cross-feed from the rudder channel for coordinating control purposes is applied to roll gyro biasing coils BV1 and BV2 producing a control tending to cause roll velocity in correspondence with rudder rate. This is accomplished by connecting coils BV1 and BV2 between a tap T1 of a potentiometer P1A paralleling potentiometer P1 in the rudder motor bridge and the tap O1 of the rudder motor bridge. The voltage appearing between tap T1 and terminal O1 is proportional to rudder motor velocity and may be varied as to magnitude to provide suitable control by adjustment of tap T1.

As earlier described herein, the roll gyro RG includes a roll pendulum RP which is pivotally mounted about the precession axis of the roll gyroscope RG and adapted for connection and disconnection with the gimbal of the roll gyroscope RG by means of a bank pendulum magnet BPM. The armature 95 is spring loaded to a position in which it disengages that portion of the bank pendulum magnet which is mounted on the roll pendulum RP. When the roll pendulum RP is deenergized, for instance, as is the case during the Boost mode of operation, the physical connection between the roll pendulum RP and the roll gyroscope RG is broken, and consequently, the roll gyro RG, which is balanced about its precession axis, responds only to roll rate. However, in the Cruise mode of operation, when the maneuver switch MS is deenergized and the contacts of the bank pendulum switch BPS are closed, the coil of the bank pendulum magnet BPM is energized, pyhsically engaging armature 95 with the roll pendulum RP to unbalance the roll gyroscope RG about its precession axis and introduce sensitivity to lateral acceleration and roll angle.

The pitch channel of the autopilot, with regard to the elevator servo motor circuitry, is similar to that as described in connection with the rudder and aileron channels, the elevator motor EM being connected as a leg of a bridge circuit having output terminals O5 and O6 and including a resistor R3 and the tapped portions of a potentiometer P3 as the remaining legs. This bridge circuit is controlled by selective control of resistor groups 105 and 106 constituting part of an elevator regulator electrical pick-off ER which is mechanically connected to and detects precessional movement of pitch rate gyroscope PG. Limit switches EL1 and EL2 in the energizing circuit for the elevator servo motor bridge establish the physical limits of elevator deflection and the mechanical connection between the elevator servo motor EM and elevator E is controlled by a clutch, the coil CC3 of which is energized at the time the D.C. power supply is connected to conductor 102. The function of this portion of the control will be understood in connection with the description of the rudder servo motor and clutch control.

The lower section of the biasing magnet system of the pitch gyroscope PG includes a set of polarizing coils PP1 and PP2 connected in bridge circuit relationship with the tapped portions of an elevator trim potentiometer ETRP and energized in dependence of the setting of the tap of the elevator trim potentiometer ETRP. This latter bridge circuit is energized by connection across the direct current power supply. These coils are additionally controlled by a voltage tapped from pitch potentiometer PP actuated by movement of control stick CS of flight controller FC about its pitch axis. Pitch potentiometer PP is also connected across the direct current power supply and its tapped portions, in effect, also form an electrical bridge including coils PP1 and PP2 in adjacent legs.

As in the case of the yaw gyro biasing magnet system, coils of the pitch gyro biasing magnet system are controlled by both velocity and position feedbacks from the elevator servo system. The electrical unbalance of the elevator servo motor bridge circuit appearing across output terminals O5 and O6 is applied across coil EV1 of the pitch gyro biasing magnet. Coils EP1 and EP2 are connected as adjacent legs of a bridge circuit including as the remaining adjacent legs the tapped portions of elevator position potentiometer EP, the tap of potentiometer EP being utilized to control the relative magnitudes of the voltages appearing on coils EP1 and EP2.

The pitch synchronizing motor PSM on the flight controller FC, in a manner corresponding to the connection of the turn synchronizing motor TSM, is connected across the armature terminals of the elevator servo motor EM. This circuit extends through the normally closed contacts of elevator synchronize switch ESS on coordinated control switch CCS. The armature winding of the pitch synchronize motor PSM is connected as an adjacent leg with resistor R12 in an electrical bridge circuit including the tapped portions of resistor R13 as the remaining adjacent legs. The output of this bridge circuit is applied across a coil EV2 in the pitch gyro biasing magnet system to introduce a control in the elevator servo loop and, hence, a control of the pitch synchronizing motor PSM, which is responsive to the elevator servo motor armature terminal voltage. This control is of such character as to stabilize the operation of the pitch synchronizing motor PSM to cause accurate follow-up of elevator position, for example, in the Standby mode of operation.

Coils UEP1 and UEP2 of the pitch biasing magnet produce up-elevator control for the pitch servo during the Cruise mode of operation. This up-elevator control is tapped from an up-elevator potentiometer UEP, the terminal ends of which are connected to the negative side of the direct current power supply and the tap of which is connected through a calibrating resistor R7 to the positive side of the power supply. With this arrangement, movement of the tap of the up-elevator potentiometer from the electrical mid-point thereof produces voltages of varying magnitudes depending upon the setting of the tap but of the same sense, that is, no polarity reversal occurs. Coils UEP1 and UEP2 are energized in dependence of the voltage tapped from the up-elevator potentiometer in a circuit extending through the contacts of up-elevator switch US which are closed when the maneuver switch MS is deenergized, which is the case in all positions of the mode selector switch MSS, except the Boost position. Hence, in the Cruise mode of operation, a circuit is established whereby up-elevator control of the elevator servo is obtained for either direction of turn. This is accomplished by driving the tap of the up-elevator potentiometer UEP from control motor CM of the transient coordinator TC. The character of the control in coordinating up-elevator application with the aileron and rudder control to produce equilibrium in a turn will be understood in connection with the discussion of the transient coordinator which appears at a later point.

The remaining coils of the pitch gyro biasing magnet system are designated VR5 and VR6. These are polarized by coils EP3 and EP4 and are controlled in such a way by the electrical output of an altitude or vertical rate control system VRC as to control pitch altitude through the pitch rate gyro biasing system to maintain a relatively fixed altitude of the craft during the Cruise mode of operation of the autopilot. The control imposes a directivity sense and a velocity sense in elevation on the pitch servo system to supplement the pitch angular rate control of the pitch-rate gyroscope for controlling the elevator servo system.

The course control unit CU is under the control of a suitable direction indicator DI. Such a direction indicator may be a conventional flux valve compass system which normally includes a flux valve compass arrangement controlling the output of a gyroscope functioning as a filter in the compass system. These details being conventional are not shown. The mechanical output of the filtering gyroscope drives the rotor element of a single-phase synchro transmitter ST. The rotor of this transmitter is energized from the single-phase 400 cycle power supply indicated and the output voltage represented in the three-wire connection of the transmitter ST with a synchro differential SD is of a pattern which indicates an error in heading of the craft.

Two modes of operation are obtained from the synchro differential. In one mode, in which brake relay B is deenergized as indicated, the output circuits of the synchro differential are short circuited by contacts B2 of the brake relay, and the remaining circuit of the output circuit of the synchro differential is connected to the single-phase supply of alternating current through the now closed contacts B1 and an autotransformer AT, which latter determines the magnitude of the energizing voltage of the synchro differential winding. With this connection, the rotating voltage pattern applied to the synchro differential from the synchro transmitter ST produces a torque due to flux linkage with the now energized windings of the output circuit of the synchro differential to drive the rotor of the synchro differential in such a direction as to reduce to zero the induced voltage in the output circuits, due to the rotating input voltage pattern.

In effect, the synchro differential functions as a course repeater tending always to index the main induction axis of its rotor with the main axis of the field. This corresponds to indexing of the rotor with the instant heading of the craft as indicated by the output voltage pattern of the synchro transmitter ST. This type of operation exists in the Standby mode of autopilot operation when the aircraft is being flown by the standard or conventional controls in the craft, and, therefore, the course unit is properly indexed to take over the control of the craft when the Cruise mode of operation is selected.

This type of operation also occurs during the Cruise mode of operation when the pilot desires to change course and manipulates the control stick CS of the flight controller FC. The details of this will be described in connection with the operation of the system.

In the Cruise mode of operation, when the control stick CS of the flight controller is in yaw detent, the brake relay B is energized. This locks the rotor of the synchro differential and applies the output of the synchro differential to a bridge including resistors R6. Resistors R6 are current sensitive and their resistance decreases as the current through them increases. The bridge circuit of which they form a part is normally adjusted for maximum unbalance when the current level is at its minimum value. This corresponds to a small error in heading of the craft. For a larger error in heading of the craft, the electrical output of the synchro differential increases. This increase in current decreases the ohmic value of resistors R6 driving the bridge circuit towards balance and limiting its output in response to the larger course error. The object in this, in commercial air liner installations, is to minimize the magnitude of heading correction so as to minimize passenger discomfort. This disproportional relationship is feasible because, in the suggested application, it is not absolutely necessary to correct course heading in proportion to the actual error, it being only necessary to maintain the error in sufficient amount to urge the craft back to the proper heading at all times.

The output of the course error bridge circuit is applied to the primary winding of a transformer TR1, the tapped portions of the secondary of which are connected as adjacent legs of an electrical bridge circuit, including the tapped portions of a potentiometer P4 as the remaining adjacent legs. Thus, the bridge circuit has applied thereto a voltage of such phase as is indicative of the direction of departure of the aircraft from a given heading. Inasmuch as this voltage is derived from the system energized from the 400 cycle supply, the frequency of this voltage corresponds to the 400 cycle supply voltage. The error in heading of the craft may, therefore, be determined by comparison of the phase of this alternating current voltage indicative of course error with the phase of the 400 cycle supply voltage. In this circuit, this is accomplished by inserting the 400 cycle supply voltage between the taps of the secondary winding of transformer TR1 and the tap of potentiometer P4. A transformer TR2 having its primary connected with the 400 cycle supply voltage and its secondary winding connected in series with a calibrating resistor R5 between the mentioned taps introduces the reference voltage into this discriminating circuit.

The output of the discriminating bridge circuit controls a vacuum tube 48 having two plate circuits generally designated 48a and 48b connected through a suitable filter circuit including a capacitor 48e and inductors 48c and 48d to output circuits CU1C and CU2C which are connected to coils CU1 and CU2 of the yaw gyro biasing magnet system. These plate circuits are connected in parallel with the positive side of the direct current power supply and the cathode 48k is connected to the negative side of the direct current power supply. Screen grid 48f is connected to the positive side of the direct current power supply while control grids 48g and 48h are connected to the respective output terminals of the electrical bridge.

By way of illustration but not limitation, the tube 48 in this application may be a Sylvania tube identified in their catalog of tubes as 28D7. The tube is used in most applications with a D.C. voltage of 28 volts and a heater or filament voltage of 28 volts. However, it appears that this tube is probably a special adaptation of a standard tube, the particular number of which is unknown to the applicants and which was originally designed for use on circuits of 100 volts and more. Reference to the tube characteristic in the Sylvania technical manual indicates that plate voltages up to 140 volts and in a few instances as high as 200 volts may be used on this tube. In such applications, the tube normally operates at temperatures which are quite high, but it is designed to withstand these high operating temperatures. The 28 volts used in this application on the plate circuit is considerably lower than the plate voltage which apparently may be normally applied to the tube. As a consequence, in order to achieve higher tube output, the grids are driven positive by the application of a positive biasing voltage to each, in order to encourage grid current and, hence, increase the current output of the tube. Reference to the tube characteristic indicates that grid currents may be at least as high as 3½ milliamps without harming the tube. The grid voltage which is applied to the tube through the center tap connection of the potentiometer is not sufficiently high to produce grid current of this order since each leg of the potentiometer is rated at least ½ megohm. Thus, it will be appreciated that the smallest grid current flowing through either leg of the bridge must flow through a resistance of at least ½ megohm, discounting the grid to cathode resistance of the tube. On this basis, grid current, due to the positive bias applied through the tap of potentiometer P4, is approximately 0.04 milliamps.

This class of operation of the tube probably drives the tube well into saturation, but in this particular application, tube saturation is not objectionable because distortion in the output of the tube is of little or no consequence insofar as the control to be accomplished is concerned.

The discriminating circuit shown is one of numerous well-known arrangements suitable for this application.

Directivity in the roll channel, as earlier noted, is achieved by connecting the roll pendulum RP to the roll gyro gimbal 61. The explanations hereinbefore made in connection with the detailed description of the roll gyroscope RG are believed sufficient to cover the function of the roll pendulum in the system.

The altitude-vertical rate control system VRC comprises an altitude chamber ALT which is opened and closed by an altitude valve magnet AVM. The coil of the altitude valve magnet AVM is connected across the direct current supply by means of a pitch detent switch S6 and the altitude cut out switch ACS on maneuver switch MS. These switches are normally closed, the altitude cut out switch being closed in all modes of operation except Boost, and the pitch detent switch being closed whenever the control switch CS of the flight controller is in pitch detent, that is, is in its neutral position. The altitude chamber is provided with a flexible diaphragm 110 which is deflected in dependence of the differential pressure between the air trapped in the altitude chamber when the altitude valve magnet AVM is closed and the static pressure at the instant altitude of the aircraft. The resulting deflection of the altitude diaphragm 110 is applied through a suitable mechanical connection to a pivoted lever 111 which at its upper end mounts a ring-shaped armature 112 of the biasing magnet system for the vertical rate control system, and, at its lower end mounts a movable contact VR selectively engaging respective contacts VR1 and VR2 constituting the vertical rate control electrical pick-off. The biasing magnet system of the vertical rate control is similar in principle to that described in connection with the roll rate gyroscope, as illustrated in Fig. 15, resulting in a magnet pull which is linear with respect to the net coil current to obtain linear control of the contacts of the vertical rate control system electrical pick-off.

The pivotally mounted lever 111 is additionally controlled by means of a force taken from a diaphragm 113 forming part of the altitude or vertical rate chamber ALTR. This chamber is vented to the atmosphere through a restricted opening 114 which may, for example, be of the character of a capillary opening. Inasmuch as this capillary restricts the passage of air into and out of the altitude chamber, the pressure drop thereacross will be proportional to the rate-of-change of static pressure such as, for example, exists in a climb or in a dive. The force exerted by diaphragm 113 on pivoted lever 111 is, therefore, proportional to the rate-of-change of static pressure which is proportional to the rate of change of altitude. Hence, the mechanical forces respresentative of absolute altitude and rate-of-change in altitude are combined in the pivoted lever 111 to cause displacement thereof for controlling the electrical pick-off.

The biasing magnet system for the altitude or vertical rate control system includes a pair of coils VP1 and VP2 which are selectively energized depending upon which of contacts VR1 or VR2 at the electrical pick-off are engaged by moving contact VR. This coil circuit is traceable from either the positive contact VR1 or the negative contact VR2, through the contact VR to the contacts of the vertical rate control switch VRCS on the maneuver switch MS, through a calibrating adjustable resistor R15 to a point between coils VR3 and VR4 which are connected in series across the direct current power supply. By this expedient, the coils are selectively energized to cause biasing of the armature 112 one direction or the reverse and the magnitude of the bias is determined by the contact current. For example, if the physical biases on lever 111 are such as to engage contact VR with contact VR1, which is the positive contact, a circuit is established from the positive conductor through contacts VR1 and VR, through contacts VRCS, assuming the maneuver switch is deenergized, through resistor R15 and through coil VR4 to the negative side of the line. The excitation of coil VR4 is related to the excitation of the remaining coils on that magnet in such a way, for example, as to cause the net excitation and, hence, the biasing magnet flux to produce a magnetic torque on lever 111 which is opposed to the physical torque due to the diaphragm forces of the altitude and the altitude rate chambers. From this torque opposition, a hovering condition is established between contacts VR and VR1 which causes minute opening and closing of the contact circuit. As a consequence, an average direct current flows in the circuit which is indicative of the physical torques acting on the pivoted lever. Thus, the current flow in the loop is indicative of the rate of change of altitude and of the altitude which exists at any instant.

Coils VP1 and VP2 are polarizing coils for the biasing magnet system and are connected in bridge circuit relationship with the vertical rate control trim potentiometer VTRP. This bridge circuit is energized across the direct current power supply, and the adjustable tap on the vertical rate trim potentiometer VTRP is used to establish magnetic equilibrium when the altitude is not changing.

Coils CDP1 and CDP2 are the remaining coils in this biasing magnet system. These coils are connected in bridge circuit relation with the climb and dive potentiometer CDP which is on the flight controller FC and actuated by movement of the control stick CS about its pitch axis. The unbalance voltage in the bridge, which is determined by positioning the tap at some point displaced from the point of electrical equilibrium in the bridge, controls the net excitation of coils CDP1 and CDP2 in such a way as to introduce a magnetic bias on the lever 111 indicative of the magnitude and the direction of the displacement of control stick CS about its pitch axis.

Considering only the vertical rate chamber in this analysis, the magnetic bias establishes a connection between the contact VR and either of contacts VR1 and VR2. The output of which, as earlier described, controls the net excitation of coils VR5 and VR6 on the pitch gyroscope PG which correspondingly controls the elevator servo ES which deflects the elevator and establishes an angular rate of the aircraft about the pitch axis. This angular rate is sensed by the pitch gyroscope PG which produces a precessional torque which opposes the magnetic torque produced by coils VR5 and VR6, and hence, establishes an angular rate in pitch corresponding to the position from detent of the control stick CS about its pitch axis. Thus far in this analysis, the control stick displacement in pitch has established a given angular rate in pitch.

An angular rate in pitch causes the aircraft to climb or dive. The resulting rate-of-change of altitude is sensed as a pressure rate by the diaphragm 110 of the altitude rate chamber. The diaphragm 110 acting on lever 111 controls the current flow at the electrical pick-off of the altitude rate control. This further regulates the bias acting on the pitch-rate gyroscope PG in such a way that the angular rate in pitch diminishes and actually becomes zero and maintains only such elevator deflection as will produce a pressure rate torque on pivoted lever 111 which is in approximate equilibrium with the magnetic torque acting thereon. Thus, the position of the control stick CS about its pitch axis establishes a given vertical rate and the angle of climb or dive for a given air speed is adjusted by the combined effects of the vertical rate control system VRC and the pitch gyroscope PG to establish the vertical rate commanded by the position of the control stick CS about its pitch axis.

In this operation, the altitude chamber ALT is opened to the atmosphere because the instant that the control stick CS is moved about its pitch axis, the pitch detent switch S6 is opened which deenergizes the spring loaded altitude valve magnet AVM. The force of the altitude diaphragm 110 is thereby removed from lever 111 since the internal pressure of the altitude chamber now corresponds to the instant static pressure. Normally, the forces of the altitude and the altitude-rate diaphragms are combined in lever 111 in such a way that the altitude-rate diaphragm force tends to anticipate and damp the movement of lever 111. The force which the altitude diaphragm 110 may exert on lever 111 may be limited by a loaded spring 120 disposed in the linkage between the altitude diaphragm 110 and pivoted lever 111. The details of this spring loaded connection 120 are not illustrated in the interests of simplicity, inasmuch as this may be any conventional type of spring loaded linkage.

The transient co-ordinator TC is essentially a time delay device designed to produce a rudder controlling voltage in response to a voltage initiated at the control stick. In accomplishing this, the motor CM of the transient co-ordinator TC is energized by the output of the transient co-ordinator electrical pick-off which comprises stationary contacts CR1 and CR2 which are respectively connected to the positive and negative sides of the direct current power supply and movable contact CR3 which is actuated by the unbalanced torque of a pair of opposed electromagnetic devices.

The electromagnetic devices comprise respective polarizing coils C3 and C4 which are connected in series across the direct current power supply. These coils establish the base flux of the opposed magnets. Coils XY3 and XY4 are energized in dependence of the differential between the voltages of taps $x$ and $y$ of potentiometers TP$x$ and TP$y$ respectively. These potentiometers are both connected across the direct current power supply, and since the coils XY3 and XY4 are connected between the taps, the arrangement is essentially an electrical bridge circuit in which the coils are energized by the unbalance voltage of the bridge. The remaining coils of the opposed magnets of the transient co-ordinator TC comprise coils CV1 and CV2 which are connected across the output terminals of an electrical bridge circuit including the control motor CM as one leg and resistor R101 as the adjacent leg. The tapped portions of potentiometer P10 constitute the remaining adjacent legs of this bridge circuit. The bridge circuit is connected between movable contact CR3 and a tap on voltage divider resistor R103 which is connected across the direct current supply. The polarity of energization depending upon which of contacts CR1 or CR2 is engaged by moving contact CR3.

As described in connection with the rudder servo motor bridge circuit, it will be appreciated that the voltage appearing across the series connected coils CV1 and CV2 is proportional to the velocity of operation of the control motor CM. This voltage is fed back in such a way as to stabilize the electrical pick-off of the transient co-ordinator.

As will be apparent from the circuits and as noted earlier herein, the voltage between taps $x$ and $y$ is applied to coils XY1 and XY2 of the roll gyro biasing magnet system. This initiates operation of the aileron servo to produce bank velocity at the instant the control stick CS of the flight controller FC is rotated to command a turn. This rotation displaces the tap $y$ of potentiometer TP$y$ from its position corresponding to that of the tap $x$ of potentiometer TP$x$. The voltage differential existing at that instant is applied to coils XY3 and XY4 of the transient co-ordinator biasing magnets. This actuates the electrical pick-off of the transient co-ordinator TC and energizes the control motor bridge circuit. Due to the mechanical connection of the rotor of the control motor CM with the tap $x$ of potentiometer TP$x$, the tap $x$ is caused to follow the tap $y$ to a point on the TP$x$ potentiometer at which the $x$ voltage matches the $y$ voltage in an effort to reduce the $xy$ voltage to zero. Since operation of the control motor CM depends upon the $xy$ voltage, the control motor CM is correspondingly controlled.

Inasmuch as coils XZ1 and XZ2 are connected as adjacent legs of a bridge with the tapped portions of potentiometer TP$x$ as the remaining adjacent legs and since tap $x$ is connected between these coils, movement of tap $x$ from the electrical midpoint of potentiometer TP$x$ produces a differential voltage between the XZ1 and XZ2 coils.

At the time the control stick of the flight controller FC is displaced to displace tap $y$, the voltage difference between coils XZ1 and XZ2 due to tap $x$ is zero. Hence, the $xy$ voltage is the first which occurs and causes operation of the ailerons to introduce bank velocity so that bank angle may be accumulated. Immediately, the control motor CM which is responsive to the $xy$ voltage, begins to operate, driving the tap $x$ in a direction to reduce the $xy$ voltage. This change in voltage of tap $x$ appears as net excitation on coils XZ1 and XZ2 of the yaw gyroscope YG, the function of which is to establish turn rate bias in correspondence with instant angles of bank so that co-ordination in a turn may be realized.

Thus far, coordination of control in roll and yaw by the transient coordinator TC has been discussed. The control voltage of tap $x$ may be utilized, if desired, on a set of coils (not shown) on the pitch biasing magnet system functioning in a similar capacity to the coils XZ1 and XZ2 on the yaw gyro biasing magnet system. However, the fluxes produced by these coils, as the polarity of the tap $x$ voltage becomes more negative or more positive with respect to the voltage at the midpoint, would have to be such as to cause the servo to produce up-elevator for either condition. This may be accomplished by properly relating the ampere turns of such a set of coils to the polarizing ampere turns in the biasing magnet system.

However, inasmuch as the rotation of the control motor CM, which produces the changing tap $x$ voltage, is proportional thereto, this motor rotation may be utilized to drive potentiometer UEP, which is the up-elevator potentiometer described previously and which controls the up-elevator biasing coils UEP1 and UEP2 of the pitch gyro biasing magnet system. Since the polarity of the up-elevator potentiometer voltage remains the same for either direction of rotation, the problem of flux polarization in the pitch biasing magnet system is minimized and up-elevator is conveniently achieved in this manner. In the coordinated turn, the altitude and altitude rate control function to maintain the altitude of the craft by introducing additional corrections, through the pitch gyroscope PG into the pitch servo drive to correct elevator position, if needed, from that established by movement of the up-elevator potentiometer to maintain fixed altitude.

According to one method of operation, the craft may be flown by the human pilot from take off to the desired altitude. After the craft is on a fixed heading, which the autopilot is to maintain, the mode selection switch MSS may be switched from Off to Standby position, if not already in the Standby position. In the Standby position, switch SW1 is closed and is maintained closed throughout the cruise and boost modes of operation. Closure of switch SW1 energizes the standby switch SS, closing the contacts of the D.C. power switch PS and the contacts of the gyro switch GS. The latter contacts apply alternating current to the phase converter PC and to the course control unit CU. With these connections, the electronic components of the system are heated and the gyroscopes of the system are brought up to speed. Additionally all autopilot connections for coordinated control are made but the servos are disconnected from the control surfaces because switch SW2 is yet closed.

During the Standby period, the course control unit CU functions as a repeater of the instant heading of the aircraft. The brake relay B is in the deenergized position shown being dependent upon the application of D.C. power to conductor 102, which is off until the mode selection switch MSS is moved to Cruise position to close switch SW2. As a consequence, the rotor of the synchro differential SD is unlocked and the energizing circuits for the rotor are established at contacts B1. At the same time, through contacts B2, the rotor signal is short-circuited from the discriminator section of the course control unit. Inasmuch as closure of gyro switch GS applies alternating current to the direction indicator, such as the flux valve compass previously mentioned, this portion of the course control unit CU is functioning, and consequently, the voltage pattern transmitted to the synchro differential SD corresponds to the heading of the aircraft. Therefore the synchro differential rotor is properly indexed for the instant heading of the craft.

When the pilot desires to engage the autopilot to maintain a fixed course and altitude, he moves the mode selector switch MSS to the Cruise position. Contacts SW2 now close. Closure of contacts SW2 completes a circuit for the coordinated control switch CCS across the power supply conductors B+ and B—. The coordinated control switch now picks up opening the elevator synchronize switch ESS and the turn synchronize switch TSS, both of which are controlled thereby. Contacts SW2 also complete a circuit from the B+ power supply conductor to conductor 102.

The application of power to conductor 102 completes an energizing circuit for the coil of brake relay B through the contacts 53 of detent switch S5 on the flight controller yaw axis. If the flight controller FC is in neutral position at this time, the contacts of switch S5 are closed, and therefore, a circuit is completed from positive conductor 102 through the contacts 53 of switch S5 through the normally closed detent switch S8 actuated by the control motor CM of the transient coordinator TC, through the coil of brake relay B, to the negative conductor B— of the power supply.

The brake relay B is now picked up opening contacts B1 and B2 which are respectively the energizing and shorting contacts in the synchro differential rotor circuit and closing contacts B3. Contacts B3 parallel detent switch S8 and form a holding circuit for the coil of brake relay B which is independent of the transient coordinator detent switch S8. The energization of brake relay B is now dependent exclusively on the yaw detent switch S5.

However, in the Cruise mode of operation, if a turn is initiated by rotation of the control stick about its yaw axis and the detent switch S5 is opened to deenergize the brake relay B, the ensuing operation of the transient coordinator TC due to the $xy$ voltage developed by displacement of the tap $y$ also opens the switch S8 on the transient coordinator. The voltages at taps $x$ and $y$ of potentiometers TP$x$ and TP$y$ now place the aircraft in a coordinated turn, the turn rate of which is indicated by the setting or position of the flight controller control switch CS about its yaw axis. If the pilot desires to return the craft to straight flight on a new course, the controller knob or stick is brought back to detent about its yaw axis. In this position, detent switch S5 is closed. In the interval of operation of the transient coordinator TC, the voltage $xy$ which is applied to the ailerons is reduced to zero as the differential voltage of coils $xz1$ and $xz2$ is produced. Thus, as the correct bank angle or the asked for turn rate at the flight controller FC is reached, the ailerons are streamlined reducing the bank or roll velocity to zero. However, the voltage at tap $x$ is maintained to hold rudder deflection in the amount required to maintain turn velocity. As a consequence, the switch S8 is opened as the flight controller is brought back to yaw detent at a rate which is greater than the aircraft and may return to straight and level flight. Consequently, the energizing circuit for the brake relay B is incomplete and remains incomplete until such as the transient coordinator TC returns switch S8 to detent.

When the flight controller FC is returned to yaw detent, the voltage $xy$ again appears, but its polarity is reversed from that which existed when the flight controller FC was displaced to command a turn. At this time, the tap $y$ is centered on its potentiometer, but the tap $x$ on the potentiometer is away from center position. This reversal in the $xy$ voltage reverses the aileron control to reverse the bank velocity from that previously described to return the craft to level position about its roll axis. The reversed $xy$ voltage now reverses control motor CM and, hence, the tap $x$ is driven toward its electrical center position on potentiometer TP$x$.

This time delay gives the craft ample opportunity to return to straight and level flight on the new course before the brake relay B is energized and locks the rotor of the synchro differential SD. Hence, the synchro differential repeats the instant heading of the aircraft up to and including the condition of straight and level flight at which time switch S8 energizes the brake relay B, locking the synchro rotor and reapplying the output of the synchro differential SD to the discriminator circuits of the course control unit CU. The function of the autopilot now holds the craft on the new heading in essentially straight and level flight. The velocity sense of the yaw, roll and pitch gyroscopes minimize excursions about each of the three axes of freedom of the aircraft.

In the Boost mode of operation, it is intended that the aircraft be flown by the human pilot by manipulation of the control stick CS of the flight controller FC. In the Boost mode of operation, such coordination as may exist depends upon the human pilot. The Boost mode is set up by moving the mode selector switch MSS to the Boost position. In this position of the switch, contacts SW1 are maintained closed, contacts SW2 are kept closed to hold the coordinated control switch CCS energized and contacts SW3 are closed to energize the maneuver switch MS.

Energization of maneuver switch MS opens the contacts of the altitude cut-out switch ACS. This deenergizes the altitude valve magnet AVM which is spring biased to open position and opens the altitude chamber ALT to static pressure. Opening of contacts VRCS disconnects the vertical rate control from the pitch gyro biasing magnet and removes the influence of the vertical rate system from the autopilot control. Opening of the contacts of the bank pendulum switch BPS on the maneuver switch MS deenergizes the bank pendulum magnet which transforms the roll gyro RG from a pendulum gyro sensitivity to lateral acceleration and roll angle in addition to its angular velocity sense, to a neutral gyro which responds only to angular velocity about the roll axis. Opening of the contacts of maneuver turn switch MTS1 and closing of the contacts of maneuver turn switch MTS2 transfers the control of turn potentiometer TP$y$ from the transient coordinator TC to the biasing coils TP1 and TP2 of the yaw gyro biasing magnet system. Opening of the contacts of delay rudder switch DRS disconnects coils XZ1 and XZ2 of the yaw gyro biasing magnet system from the taps $x$ and $z$ of transient coordinator potentiometers TP$x$ and TP$y$. Closing of the contacts of bank switch BS increases the control effect of bank potentiometer BP, located on the flight controller FC, on coils BP1 and BP2, by shunting resistor R111 which formerly completed this circuit. This recalibrates the bank control from the bank potentiometer to provide a higher degree of excitation of coils BP1 and BP2 in the roll gyroscope biasing system for the same degree of deflection of the control stick about its roll axis. Opening of up-elevator switch US disconnects the control of the up-elevator potentiometer UEP from the coils UEP1 and UEP2 in the pitch gyroscope biasing magnet system. The control now afforded on the aircraft is that of a rate regulated boost system, whereby for a few ounces of pressure exerted on the control stick CS of the flight controller FC, sufficient force is applied by the respective servo drives to the control surfaces of the craft to adequately control the aircraft in dependence of control stick movement about its three degrees of angular freedom.

If for any reason during the Standby mode of operation the human pilot had found it necessary or had desired to connect the autopilot in the Cruise mode at such time as the aircraft may have been in curved flight, the only action required is that of moving the mode selector switch from Standby to Cruise position. In the Standby mode, the elevator synchronize switch ESS and the turn synchronize switch TSS on the coordinated control switch CCS are closed which establishes the energizing circuits for the pitch synchronize motor and turn synchronize motor PSM and TSM, respectively, on the flight controller FC. Consequently, the flight controller and, hence, the automatic pilot are synchronized with the instant positions of the respective control surfaces and the autopilot is ready to take over flight the instant switching to the Cruise mode occurs. Due to the course repeater function of the synchro differential SD, the autopilot will be locked onto that heading which exists at the time the control stick is returned to yaw detent. The function of the autopilot is then that of leveling the craft off on the course indicated by the course control unit CU.

If the human pilot should desire to switch from Standby to the Boost mode of operation, the mode selector switch is moved to Boost position through the Cruise position. This promptly disconnects the cruise circuits established upon passing through the Cruise position and connects the autopilot for three degrees of freedom for boost control from the control stick CS of the flight controller FC.

Since certain changes may be made in the above described construction and different embodiments of the invention may be made without departing from the spirit and scope thereof, it is intended that all matter contained in the above description and shown in the accompanying drawings shall be considered as illustrative and not in a limiting sense.

We claim as our invention:

1. In a control for a conveyance operable in space and having freedom of motion about a turn axis, a roll axis and a pitch axis, the combination of, a turn gyroscope, a roll gyroscope and a pitch gyroscope, means mounting each gyroscope for limited angular freedom about a single output axis in a position on said conveyance to respond to the angular velocity of motion of said conveyance about the corresponding one of the turn, roll and pitch axes, electromagnetic means for biasing each gyroscope about the output axis thereof, means responsive to motion of each gyroscope about the output axis thereof for controlling said conveyance about said turn, roll and pitch axes, a piloting member, means mounting said piloting member for three degrees of freedom having a space relation corresponding to the turn, roll and pitch axes of said conveyance, and means for each of the three degrees of freedom of said piloting member for controlling energization of the corresponding electromagnetic means in response to motion of said piloting member in the corresponding degree of freedom thereof.

2. An aircraft flight controller comprising, a frame, bearing means in said frame, a first gimbal pivotally mounted by said bearing means, a second gimbal pivotally mounted on said first gimbal about an axis angularly displaced from the axis of said bearing means, a plate having an arcuate face, said plate being supported on said second gimbal with the arcuate face thereof adjacent an extremity of said bearing means, said plate having a recess therein, said bearing means having an axial hole therethrough, a plunger slidably fitted through said opening and having an extremity adapted to engage said arcuate face in the path of travel of said recess, and means associated with said plunger for forcing said extremity against said arcuate face.

3. An aircraft flight controller comprising, a frame, bearing means in said frame, a first gimbal pivotally mounted by said bearing means, a second gimbal pivotally mounted on said first gimbal about an axis angularly displaced from the axis of said bearing means, a plate having an arcuate face, said plate being supported on said second gimbal with the arcuate face thereof adjacent an extremity of said bearing means, said plate having a recess therein, said bearing means having an axial hole therethrough, a plunger slidably fitted through said opening and having an extremity adapted to engage said arcuate face in the path of travel of said recess, and electromagnetic means connected with said plunger for biasing said extremity against said arcuate face.

4. An aircraft flight controller comprising, a frame, bearing means in said frame, a first gimbal pivotally mounted by said bearing means, a second gimbal pivotally mounted on said first gimbal about an axis angularly displaced from the axis of said bearing means, a plate having an arcuate face, said plate being supported on said second gimbal with the arcuate face thereof adjacent an extremity of said bearing means, said plate having a recess therein, said bearing means having an axial hole therethrough, a plunger slidably fitted through said opening and having an extremity adapted to engage said arcuate face in the path of travel of said recess, a megnetizable plate connected to said plunger, and an electromagnet disposed in flux linkage with said plate.

5. An aircraft flight controller comprising, a frame, bearing means on said frame, a first gimbal pivotally mounted on said bearing means, a second gimbal pivotally mounted on said first gimbal about an axis angularly displaced from the axis of said bearing means, a control member rotatably mounted on said second gimbal, a first detent means connected between said first gimbal and said second gimbal, electromagnetic means associated with said first detent means for controlling release and engagement thereof, second detent means connected between said second gimbal and said control member, and electromagnetic means associated with said second detent means for controlling release and engagement of said second detent means.

6. An aircraft flight controller comprising, a frame, bearing means on said frame, a first gimbal pivotally mounted on said bearing means, a second gimbal pivotally mounted on said first gimbal about an axis angularly displaced from the axis of said bearing means, a control member rotatably mounted on said second gimbal, a first detent means connected between said first gimbal and said second gimbal, electromagnetic means associated with said first detent means for controlling release and engagement thereof, second detent means connected between said second gimbal and said control member, electromagnetic means associated with said second detent means for controlling release and engagement of said second detent means, motor means disposed on said first gimbal and having a driving connection with said second gimbal, motor means disposed on said second gimbal and having a driving connection with said control member, and circuit means connected to energize both of said motor means and to deenergize both of said electromagnetic means.

7. Flight control apparatus for controlling a craft having control means for effecting maneuverability comprising, a movable member, automatic pilot means controlled by said movable member and connected to control said control means, electromagnetically operated detent means engageable with said movable member affording restrained movement of the movable member at a given position thereof when said electromagnetically operated detent means is energized, motor means responsive to operation of said control means and connected to drive said movable member, and switch means operable in one position to deenergize said motor means and operable in a second position to deenergize said electromagnetically operated detent means and energize said motor means.

8. Flight control apparatus for a craft comprising a maneuver means for effecting control of said craft, a flight controller having a movable manually operable member, control means adapted to actuate said maneuver means and controlled by said manually operable member, motor means connected to drive said manually operable member; circuit means responsive to operation of said maneuver means, electromagnetically operated detent means engageable with said manually operable member upon energization of said electromagnetically operated detent means, selector switch means operable in one position to connect said circuit means to said motor means, and operable in a second position to disconnect said circuit means from said motor means and to energize said electromagnetically operated detent means and to connect said control means to said maneuver means.

9. Flight control apparatus for controlling a craft having turn control means, roll control means and pitch control means comprising, a flight controller including a support, a first member rotatably mounted on said support, a second member rotatably mounted on said first member, a manually operable member rotatably mounted on said second member, first detent means engageable between said first member and said second member and adapted to releasably restrain said first and second members in one angular relation, controllable detent biasing means connected with said first detent means for operating said first detent means to engage said first and said second members, second detent means engageable between said second member and said manually operable member and adapted to releasably restrain said second and said manually operable members in one angular relation, controllable detent biasing means connected with said second detent means for operating said second detent means to engage said second and said manually operable members, respective electrical pickoffs responsive to angular displacement between said manually operable member and said second member, between said second member and said first member, and between said first member and said support, and respective electrically operated control means connected with said respective electrical pickoffs for controlling said turn control means, said roll control means and said pitch control means.

10. A lateral rate autopilot for a craft having freedom of movement about a roll axis and having roll control means for controlling movement about said roll axis comprising, a gyroscope, means mounting said gyroscope for precessional movement about a precession axis substantially perpendicular to said roll axis and substantially parallel to the yaw axis of said craft, a mass pivotally mounted about an axis substantially paralleling said precession axis, the center of gravity of said mass being displaced from the axis of pivoting thereof, movable mechanical means engageable between said gyroscope and said mass for connecting said mass to said gyroscope in one position and in a second position releasing said gyroscope from said mass, electrical pickoff means actuated by displacement of said gyroscope about said output axis and connected to control said roll control means, biasing means connected to said gyroscope to control movement thereof about said precession axis, a manually operable member, electrical pickoff means actuated by said manually operable member and connected to control said biasing means, and means connected with said movable mechanical means for operating said movable mechanical means between said one and said second positions.

11. A lateral rate autopilot for aircraft having freedom of movement about yaw and roll axes comprising, a gyroscope, means mounting said gyroscope for precessional movement about a precession axis substantially paralleling said yaw axis, a mass, means pivotally mounting said mass about an axis displaced from the center of gravity thereof and substantially paralleling said precession axis, mechanical means movable between two positions connecting and disconnecting said mass and said gyroscope, roll control means for controlling angular movement of said craft about said roll axis, means connected with said mechanical means for moving said mechanical means between said two positions, and electrical pickoff means actuated by displacement of said gyroscope about said precession axis and connected to control said roll control means.

12. Flight control apparatus for a craft comprising a maneuver means for effecting control of said craft, a flight controller having a movable manually operable member, control means adapted to actuate said maneuver means and controlled by said manually operable member, motor means connected to drive said manually operable member; circuit means responsive to operation of said maneuver means, electromagnetically operated detent means engageable with said manually operable member upon energization of said electromagnetically operated detent means, selector switch means operable in one position to connect said circuit means to said motor means, and operable in a second position to disconnect said circuit means from said motor means and to energize said electro magnetically operated detent means and to connect said control means to said maneuver means, said control means including an automatic pilot.

13. Flight control apparatus for a craft comprising a maneuver means for effecting control of said craft, a flight controller having a movable manually operable member, control means adapted to actuate said maneuver means and controlled by said manually operable member, motor means connected to drive said manually operable member; circuit means responsive to operation of said maneuver means, electromagnetically operated detent means engageable with said manually operable member upon energization of said electromagnetically operated detent means, selector switch means operable in one position to connect said circuit means to said motor means, and operable in a second position to disconnect said circuit means from said motor means and to energize said electromagnetically operated detent means and to connect said control means to said maneuver means, said circuit means comprising an electrical pickoff controlled by said maneuver means.

14. Flight control apparatus for a craft comprising a maneuver means for effecting control of said craft, a flight controller having a movable manually operable member, control means adapted to actuate said maneuver means and controlled by said manually operable member, motor means connected to drive said manually operable member; circuit means responsive to operation of said maneuver means, electromagnetically operated detent means engageable with said manually operable member upon energization of said electromagnetically operated detent means, selector switch means operable in one position to connect said circuit means to said motor means, and operable in a second position to disconnect said circuit means from said motor means and to energize said electromagnetically operated detent means and to connect said control means to said maneuver means, said circuit means comprising an electrical bridge circuit including an electrical pickoff controlled by said motor means and an electrical pickoff controlled by said maneuver means, said motor being controlled in dependence of the difference of the electrical outputs of said electrical outputs.

15. Flight control apparatus for a craft comprising a maneuver means for effecting control of said craft, a flight controller having a movable manually operable member, control means adapted to actuate said maneuver means and controlled by said manually operable member, motor means connected to drive said manually operable member; circuit means responsive to operation of said manuever means, electromagnetically operated detent means engageable with said manually operable member upon energization of said electromagnetically operated detent means, selector switch means operable in one position to connect said circuit means to said motor means, and operable in a second position to disconnect said circuit means from said motor means and to energize said electromagnetically operated detent means and to connect said control means to said maneuver means, said control means including an automatic pilot having a rate gyroscope therein disposed to respond to angular rates of movement of said craft about one axis of freedom, said rate gyroscope having a single output axis, biasing means connected with said rate gyroscope for imposing torques thereon about said single output axis, and means responsive to movement of said manually operable member for controlling said biasing means.

16. Flight control apparatus for controlling a craft having turn control means, roll control means and pitch control means comprising, a flight controller including a support, a first member rotatably mounted on said support, a second member rotatably mounted on said first member, a manually operable member rotatably mounted on said second member, first detent means engageable between said first member and said second member and adapted to releasably restrain said first and second members in one angular relation, controllable detent biasing means connected with said first detent means for operating said first detent means to engage said first and said second members, second detent means engageable between said second member and said manually operable member and adapted to releasably restrain said second and said manually operable members in one angular relation, controllable detent biasing means connected with said second detent means for operating said second detent means to engage said second and said manually operable members, respective electrical pickoffs responsive to angular displacement between said manually operable member and said second member, between said second member and said first member, and between said first member and said support, and respective electrically operated control means connected with said respective electrical pickoffs for controlling said turn control means, said roll control means and said pitch control means, each of said controllable detent biasing means comprising an electromagnet having a movable armature member connected with said detent means.

17. Flight control apparatus for controlling a craft having turn control means, roll control means and pitch control means comprising, a flight controller including a support, a first member rotatably mounted on said support, a second member rotatably mounted on said first member, a manually operable member rotatably mounted on said second member, first detent means engageable between said first member and said second member and adapted to releasably restrain said first and second members in one angular relation, controllable detent biasing means connected with said first detent means for operating said first detent means to engage said first and said second members, second detent means engageable between said second member and said manually operable member and adapted to releasably restrain said second and said manually operable members in one angular relation, controllable detent biasing means connected with said second detent means for operating said second detent means to engage said second and said manually operable members, respective electrical pickoffs responsive to angular displacement between said manually operable member and said second member, between said second member and said first member, and between said first member and said support, respective electrically operated control means connected with said respective electrical pickoffs for controlling said turn control means, said roll control means and said pitch control means, each of said controllable detent biasing means comprising an electromagnet having a movable armature member connected with said detent means, motor means having a driving connection with said second member, motor means having a driving connection with said manually operable member, and means for selectively energizing both of said motor means and both of said electromagnets.

18. Flight control apparatus for controlling a craft having turn control means, roll control means and pitch control means comprising, a flight controller including a support, a first member rotatably mounted on said support, a second member rotatably mounted on said first member, a manually operable member rotatably mounted on said second member, first detent means engageable between said first member and said second member and adapted to releasably restrain said first and second members in one angular relation, controllable detent biasing means connected with said first detent means for operating said first detent means to engage said first and second members, second detent means engageable between said second member and said manually operable member and adapted to releasably restrain said second and said manually operable members in one angular relation, controllable detent biasing means connected with said second detent means for operating said second detent means to engage said second and said manually operable members, respective electrical pickoffs responsive to angular displacement between said manually operable member and said second member, between said second member and said first member, and between said first member and said support, respective electrically operated control means connected with said respective electrical pickoffs for controlling said turn control means, said roll control means and said pitch control means, said electrically operated control means comprising respective rate gyroscopes disposed to respond to angular rates of said craft in yaw, roll and pitch, gyroscope biasing means connected with each rate gyroscope for controlling the output thereof, and circuit means connecting the biasing means of one of said gyroscopes to one of said electrical pickoffs.

19. Flight control apparatus for controlling a craft having turn control means, roll control means and pitch control means comprising, a flight controller including a support, a first member rotatably mounted on said support, a second member rotatably mounted on said first member, a manually operable member rotatably mounted on said second member, first detent means engageable between said first member and said second member and adapted to releasably restrain said first and second members in one angular relation, controllable detent biasing means connected with said first detent means for operating said first detent means to engage said first and said second members, second detent means engageable between said second member and said manually operable member and adapted to releasably restrain said second and said manually operable members in one angular relation, controllable detent biasing means connected with said second detent means for operating said second detent means to engage said second and said manually operable members, respective electrical pickoffs responsive to angular displacement between said manually operable member and said second member, between said second member and said first member, and between said first member and said support, respective electrically operated control means connected with said respective electrical pickoffs for controlling said turn control means, said roll control means and said pitch control means, said electrically operated control means comprising a yaw rate gyroscope, a roll rate gyroscope and a pitch rate gyroscope; biasing means on said roll rate gyroscope for controlling the output thereof, and circuit means connecting said biasing means with one of said electrical pickoffs.

20. Flight control apparatus for controlling a craft having turn control means, roll control means and pitch control means comprising, a flight controller including a support, a first member rotatably mounted on said support, a second member rotatably mounted on said first member, a manually operable member rotatably mounted on said second member, first detent means engageable between said first member and said second member and adapted to releasably restrain said first and second members in one angular relation, controllable detent biasing means connected with said first detent means for operating said first detent means to engage said first and said second members, second detent means engageable between said second member and said manually operable member and adapted to releasably restrain said second and said manually operable members in one angular relation, controllable detent biasing means connected with said second detent means for operating said second detent means to engage said second and said manually operable members, respective electrical pickoffs responsive to angular displacement between said manually operable member and said second member, between said second member and said first member, and between said first member and said support, and respective electrically operated control means connected with said respective electrical pickoffs for controlling said turn control means, said roll control means and said pitch control means, said electrically operated control means comprising a yaw rate gyroscope, a roll rate gyroscope and a pitch rate gyroscope; each gyroscope having freedom of movement about a single output axis, respective gyro electrical pickoffs connected with each gyroscope and responsive to movement about said respective single output axes, circuit means connecting said respective gyro electrical pickoffs to said yaw control means, to said roll control means and to said pitch control means; gyro biasing means connected to one of said gyroscopes for controlling movement thereof about its single output axis, and circuit means connecting said gyro biasing means to one of said electrical pickoffs on said flight controller.

21. Flight control apparatus for controlling a craft having turn control means, roll control means and pitch control means comprising, a flight controller including a support, a first member rotatably mounted on said support, a second member rotatably mounted on said first member, a manually operable member rotatably mounted on said second member, first detent means engageable between said first member and said second member and adapted to releasably restrain said first and second members in one angular relation, controllable detent biasing means connected with said first detent means for operating said first detent means to engage said first and second members, second detent means engageable between said second member and said manually operable member and adapted to releasably restrain said second and said manually operable members in one angular relation, controllable detent biasing means connected with said second detent means for operating said second detent means to engage said second and said manually operable members, respective electrical pickoffs responsive to angular displacement between said manually operable member and said second member, between said second member and said first member, and between said first member and said support, and respective electrically operated control means connected with said respective electrical pickoffs for controlling said turn control means, said roll control means and said pitch control means, said electrically operated control means comprising a yaw rate gyroscope, a roll rate gyroscope and a pitch rate gyroscope; each gyroscope having freedom of movement about a single output axis, respective gyro electrical pickoffs connected with each gyroscope and responsive to movement about said respective single output axes, circuit means connecting said respective gyro electrical pickoffs to said yaw control means, to said roll control means and to said pitch control means; gyro biasing means connected to one of said gyroscopes for controlling movement thereof about its single output axis, and circuit means connecting said gyro biasing means to one of said electrical pickoffs on said flight controller, said gyro biasing means comprising an electromagnetic assembly having a coil, a core and a movable armature, said armature being mounted on said roll rate gyroscope for angular displacement about said single output axis in spaced relation with said core forming an airgap between said core and said armature, said armature moving transversely of said airgap maintaining a substantially constant airgap dimension and varying the area of the overlapping confronting faces of the core and the armature.

22. A lateral rate autopilot for aircraft having freedom of movement about yaw and roll axes comprising, a gyroscope, means mounting said gyroscope for precessional movement about a precession axis substantially paralleling said yaw axis, a mass, means pivotally mounting said mass about an axis displaced from the center of gravity thereof and substantially paralleling said precession axis, mechanical means movable between two positions connecting and disconnecting said mass and said gyroscope, roll control means for controlling regular movement of said craft about said roll axis, means connected with said mechanical means for moving said mechanical means between said two positions, and electrical pickoff means actuated by displacement of said gyroscope about said precession axis and connected to control said roll control means, said mass being pivoted about said precession axis.

23. A lateral rate autopilot for aircraft having freedom of movement about yaw and roll axes comprising, a gyroscope, means mounting said gyroscope for precessional movement about a precession axis substantially paralleling said yaw axis, a mass, means pivotally mounting said mass about an axis displaced from the center of gravity thereof and substantially paralleling said precession axis, mechanical means movable between two positions connecting and disconnecting said mass and said gyroscope, roll control means for controlling regular movement of said craft about said roll axis, means connected with said mechanical means for moving said mechanical means between said two positions, and electrical pickoff means actuated by displacement of said gyroscope about said precession axis and connected to control said roll control means, said mass being pivoted about said precession axis and said mechanical means comprising a magnetizable member resiliently mounted on said gyroscope and a magnetizable member mounted on said mass in proximity to said first-named magnetizable member and coil means disposed in flux linkage with both said magnetizable members.

References Cited in the file of this patent

UNITED STATES PATENTS

| | | |
|---|---|---|
| 1,564,872 | McMullen | Dec. 8, 1925 |
| 2,441,307 | Alkan | May 11, 1948 |
| 2,475,484 | De Nise | July 5, 1949 |
| 2,539,411 | Esval | Jan. 30, 1951 |
| 2,555,981 | Lynch | June 5, 1951 |
| 2,559,298 | Hayes | July 3, 1951 |
| 2,579,570 | Hauptman | Dec. 25, 1951 |
| 2,611,559 | Meredith | Sept. 23, 1952 |
| 2,614,776 | Rossire | Oct. 21, 1952 |
| 2,681,777 | Rossire | June 22, 1954 |
| 2,686,022 | Hanna | Aug. 10, 1954 |
| 2,740,082 | Sedgfield | Mar. 27, 1956 |